United States Patent
Ramos et al.

(10) Patent No.: US 8,732,004 B1
(45) Date of Patent: May 20, 2014

(54) AUTOMATED ANALYSIS OF DATA TO GENERATE PROSPECT NOTIFICATIONS BASED ON TRIGGER EVENTS

(75) Inventors: Armando Ramos, Santa Maria, CA (US); Stephen R. Meeks, Orange, CA (US); Michele M. Bodda, Foothill Ranch, CA (US); Pamela Fielding, Anaheim Hills, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 904 days.

(21) Appl. No.: 11/231,339

(22) Filed: Sep. 20, 2005

Related U.S. Application Data

(60) Provisional application No. 60/612,313, filed on Sep. 22, 2004.

(51) Int. Cl.
*G06Q 30/00* (2012.01)
*G06Q 90/00* (2006.01)

(52) U.S. Cl.
CPC ............................ *G06Q 90/00* (2013.01)
USPC ........................................... 705/14.1

(58) Field of Classification Search
CPC ........................................... G06Q 90/00
USPC ................................... 705/14, 14.1
See application file for complete search history.

(56) References Cited

U.S. PATENT DOCUMENTS

| | | | |
|---|---|---|---|
| 4,775,935 A | 10/1988 | Yourick | |
| 4,872,113 A | 10/1989 | Dinerstein | |
| 4,982,346 A | 1/1991 | Girouard et al. | |
| 5,056,019 A | 10/1991 | Schultz et al. | |
| 5,201,010 A | 4/1993 | Deaton et al. | |
| 5,283,731 A | 2/1994 | Lalonde et al. | |

(Continued)

FOREIGN PATENT DOCUMENTS

CN 1290372 5/2001
EP 0 749 081 A1 12/1966

(Continued)

OTHER PUBLICATIONS

"New Privista Product Provides Early Warning System to Combat Identity Theft", PR Newswire, Oct. 24, 2000, PR Newswire Association, Inc., New York.

(Continued)

*Primary Examiner* — Daniel Lastra
(74) *Attorney, Agent, or Firm* — Knobbe, Martens, Olson & Bear LLP

(57) ABSTRACT

Systems and methods are described for identifying a subset of interest from a general population and for monitoring a database of daily activity logs associated with the general population in order to identify database entries indicative of an occurrence of a pre-defined trigger event that is associated with a member of the subset of interest. In particular, systems and methods are described that allow a massive database of daily activity logs to be monitored to identify trigger events that have occurred within the past twenty-four hours or other very recent time period. Embodiments are described that may be advantageously used by a provider of credit-related products and/or services who wishes to accurately target prospective customers, identified by the system, based on occurrence of a trigger event, as being in a decision-making phase of credit shopping, for purposes of making a timely and targeted offering relevant to the customers' current activities.

16 Claims, 8 Drawing Sheets

(56) References Cited

U.S. PATENT DOCUMENTS

| | | | |
|---|---|---|---|
| 5,305,195 A | 4/1994 | Murphy | |
| 5,353,218 A | 10/1994 | De Lapa et al. | |
| 5,361,201 A | 11/1994 | Jost et al. | |
| 5,459,306 A | 10/1995 | Stein et al. | |
| 5,515,098 A | 5/1996 | Carles | |
| 5,592,560 A | 1/1997 | Deaton et al. | |
| 5,621,812 A | 4/1997 | Deaton et al. | |
| 5,627,973 A | 5/1997 | Armstrong et al. | |
| 5,659,731 A | 8/1997 | Gustafson | |
| 5,661,516 A | 8/1997 | Carles | |
| 5,696,907 A | 12/1997 | Tom | |
| 5,724,521 A | 3/1998 | Dedrick | |
| 5,740,549 A | 4/1998 | Reilly et al. | |
| 5,774,868 A | 6/1998 | Cragun et al. | |
| 5,822,410 A | 10/1998 | McCausland | |
| 5,848,396 A | 12/1998 | Gerace | |
| 5,857,174 A | 1/1999 | Dugan | |
| 5,857,175 A | 1/1999 | Day et al. | |
| 5,864,822 A | 1/1999 | Baker, III | |
| 5,873,068 A | 2/1999 | Beaumont et al. | |
| 5,878,403 A | 3/1999 | DeFrancesco et al. | |
| 5,940,812 A | 8/1999 | Tengel et al. | |
| 5,944,790 A | 8/1999 | Levy | |
| 5,966,695 A | 10/1999 | Melchione et al. | |
| 5,970,478 A | 10/1999 | Walker et al. | |
| 5,974,396 A | 10/1999 | Anderson et al. | |
| 5,991,735 A | 11/1999 | Gerace | |
| 6,044,357 A | 3/2000 | Garg | |
| 6,070,147 A | 5/2000 | Harms et al. | |
| 6,073,140 A | 6/2000 | Morgan et al. | |
| 6,085,169 A | 7/2000 | Walker et al. | |
| 6,101,486 A | 8/2000 | Roberts et al. | |
| 6,115,694 A | 9/2000 | Cheetham et al. | |
| 6,144,948 A | 11/2000 | Walker et al. | |
| 6,182,060 B1 | 1/2001 | Hedgcock et al. | |
| 6,208,979 B1 | 3/2001 | Sinclair | |
| 6,236,977 B1 | 5/2001 | Verba et al. | |
| 6,289,318 B1 | 9/2001 | Barber | |
| 6,298,330 B1 | 10/2001 | Gardenswartz et al. | |
| 6,317,752 B1 | 11/2001 | Lee et al. | |
| 6,324,566 B1 | 11/2001 | Himmel et al. | |
| 6,334,110 B1 | 12/2001 | Walter et al. | |
| 6,385,592 B1 | 5/2002 | Angles et al. | |
| 6,385,594 B1 | 5/2002 | Lebda et al. | |
| 6,442,577 B1 | 8/2002 | Britton et al. | |
| 6,457,012 B1 | 9/2002 | Jatkowski | |
| 6,460,036 B1 | 10/2002 | Herz | |
| 6,505,168 B1 | 1/2003 | Rothman et al. | |
| 6,513,018 B1 | 1/2003 | Culhane | |
| 6,529,878 B2 | 3/2003 | De Rafael et al. | |
| 6,611,816 B2 | 8/2003 | Lebda et al. | |
| 6,615,247 B1 | 9/2003 | Murphy | |
| 6,622,266 B1 | 9/2003 | Goddard et al. | |
| 6,623,529 B1 | 9/2003 | Lakritz | |
| 6,640,215 B1 | 10/2003 | Galperin et al. | |
| 6,665,715 B1 | 12/2003 | Houri | |
| 6,703,930 B2 | 3/2004 | Skinner | |
| 6,757,740 B1 | 6/2004 | Parekh et al. | |
| 6,810,356 B1 | 10/2004 | Garcia-Franco et al. | |
| 6,865,566 B2 | 3/2005 | Serrano-Morales et al. | |
| 6,925,441 B1 | 8/2005 | Jones, III et al. | |
| 6,959,281 B1 | 10/2005 | Freeling et al. | |
| 6,965,889 B2 | 11/2005 | Serrano-Morales et al. | |
| 6,983,478 B1 | 1/2006 | Grauch et al. | |
| 6,993,493 B1 | 1/2006 | Galperin et al. | |
| 7,003,792 B1 | 2/2006 | Yuen | |
| 7,028,052 B2 | 4/2006 | Chapman et al. | |
| 7,033,792 B2 | 4/2006 | Zhong et al. | |
| 7,039,176 B2 | 5/2006 | Borodow et al. | |
| 7,072,853 B2 | 7/2006 | Shkedi | |
| 7,072,963 B2 | 7/2006 | Anderson et al. | |
| 7,085,734 B2 | 8/2006 | Grant et al. | |
| 7,150,030 B1 | 12/2006 | Eldering et al. | |
| 7,152,018 B2 | 12/2006 | Wicks | |
| 7,152,053 B2 | 12/2006 | Serrano-Morales et al. | |
| 7,152,237 B2 | 12/2006 | Flickinger et al. | |
| 7,185,353 B2 | 2/2007 | Schlack | |
| 7,200,602 B2 | 4/2007 | Jonas | |
| 7,275,083 B1 | 9/2007 | Seibel et al. | |
| 7,296,734 B2 * | 11/2007 | Pliha | 235/379 |
| 7,366,694 B2 | 4/2008 | Lazerson | |
| 7,376,603 B1 * | 5/2008 | Mayr et al. | 705/35 |
| 7,424,439 B1 | 9/2008 | Fayyad et al. | |
| 7,472,088 B2 | 12/2008 | Taylor et al. | |
| 7,499,868 B2 | 3/2009 | Galperin et al. | |
| 7,546,266 B2 * | 6/2009 | Beirne et al. | 705/37 |
| 7,546,619 B2 | 6/2009 | Anderson et al. | |
| 7,571,139 B1 | 8/2009 | Giordano et al. | |
| 7,580,856 B1 | 8/2009 | Pliha | |
| 7,590,589 B2 | 9/2009 | Hoffberg | |
| 7,610,257 B1 | 10/2009 | Abrahams | |
| 7,653,592 B1 | 1/2010 | Flaxman | |
| 7,672,865 B2 | 3/2010 | Kumar et al. | |
| 7,676,751 B2 | 3/2010 | Allen et al. | |
| 7,698,236 B2 | 4/2010 | Cox et al. | |
| 7,707,059 B2 | 4/2010 | Reed et al. | |
| 7,730,509 B2 | 6/2010 | Boulet et al. | |
| 7,747,559 B2 | 6/2010 | Leitner et al. | |
| 7,788,147 B2 | 8/2010 | Haggerty et al. | |
| 7,925,549 B2 | 4/2011 | Looney et al. | |
| 7,962,404 B1 | 6/2011 | Metzger, II et al. | |
| 7,996,521 B2 | 8/2011 | Chamberlain et al. | |
| 8,015,045 B2 | 9/2011 | Galperin et al. | |
| 8,036,979 B1 | 10/2011 | Torrez et al. | |
| 8,086,524 B1 | 12/2011 | Craig et al. | |
| 8,126,805 B2 | 2/2012 | Sulkowski et al. | |
| 8,135,607 B2 | 3/2012 | Williams et al. | |
| 8,145,754 B2 | 3/2012 | Chamberlain et al. | |
| 8,271,313 B2 | 9/2012 | Williams et al. | |
| 8,285,577 B1 | 10/2012 | Galperin et al. | |
| 8,301,574 B2 | 10/2012 | Kilger et al. | |
| 8,315,943 B2 | 11/2012 | Torrez et al. | |
| 8,533,322 B2 | 9/2013 | Chamberlain et al. | |
| 8,560,161 B1 | 10/2013 | Kator et al. | |
| 8,595,101 B1 | 11/2013 | Daukas et al. | |
| 8,606,626 B1 | 12/2013 | DeSoto et al. | |
| 8,606,666 B1 | 12/2013 | Courbage et al. | |
| 2001/0014868 A1 | 8/2001 | Herz et al. | |
| 2002/0023051 A1 | 2/2002 | Kunzle et al. | |
| 2002/0035520 A1 | 3/2002 | Weiss | |
| 2002/0046099 A1 | 4/2002 | Frengut et al. | |
| 2002/0049624 A1 | 4/2002 | Raveis, Jr. | |
| 2002/0049968 A1 | 4/2002 | Wilson et al. | |
| 2002/0055906 A1 | 5/2002 | Katz et al. | |
| 2002/0077964 A1 | 6/2002 | Brody et al. | |
| 2002/0082892 A1 | 6/2002 | Raffel et al. | |
| 2002/0099824 A1 | 7/2002 | Bender et al. | |
| 2002/0123904 A1 | 9/2002 | Amengual et al. | |
| 2002/0128960 A1 | 9/2002 | Lambiotte et al. | |
| 2002/0129368 A1 | 9/2002 | Schlack et al. | |
| 2002/0133404 A1 | 9/2002 | Pedersen | |
| 2002/0133462 A1 | 9/2002 | Shteyn | |
| 2002/0147669 A1 * | 10/2002 | Taylor et al. | 705/35 |
| 2002/0161664 A1 | 10/2002 | Shaya et al. | |
| 2002/0169747 A1 | 11/2002 | Chapman et al. | |
| 2003/0018549 A1 | 1/2003 | Fei et al. | |
| 2003/0023489 A1 | 1/2003 | McGuire et al. | |
| 2003/0033242 A1 | 2/2003 | Lynch et al. | |
| 2003/0036996 A1 | 2/2003 | Lazerson | |
| 2003/0041050 A1 | 2/2003 | Smith et al. | |
| 2003/0046222 A1 * | 3/2003 | Bard et al. | 705/38 |
| 2003/0065563 A1 | 4/2003 | Elliott et al. | |
| 2003/0078897 A1 | 4/2003 | Florance et al. | |
| 2003/0097380 A1 | 5/2003 | Mulhern et al. | |
| 2003/0216965 A1 | 11/2003 | Libman | |
| 2003/0233323 A1 | 12/2003 | Bilski et al. | |
| 2004/0039688 A1 | 2/2004 | Sulkowski et al. | |
| 2004/0062213 A1 | 4/2004 | Koss | |
| 2004/0078809 A1 | 4/2004 | Drazin | |
| 2004/0098625 A1 | 5/2004 | Lagadec et al. | |
| 2004/0102197 A1 | 5/2004 | Dietz | |
| 2004/0107125 A1 | 6/2004 | Guheen et al. | |
| 2004/0122730 A1 | 6/2004 | Tucciarone et al. | |
| 2004/0122735 A1 | 6/2004 | Meshkin | |

(56) References Cited

U.S. PATENT DOCUMENTS

| | | |
|---|---|---|
| 2004/0128193 A1 | 7/2004 | Brice et al. |
| 2004/0128230 A1 | 7/2004 | Oppenheimer et al. |
| 2004/0128236 A1 | 7/2004 | Brown et al. |
| 2004/0133493 A1 | 7/2004 | Ford et al. |
| 2004/0139025 A1 | 7/2004 | Coleman |
| 2004/0163101 A1 | 8/2004 | Swix |
| 2004/0199584 A1 | 10/2004 | Kirshenbaum et al. |
| 2004/0205157 A1 | 10/2004 | Bibelnieks et al. |
| 2004/0243450 A1 | 12/2004 | Bernard, Jr. et al. |
| 2004/0243588 A1 | 12/2004 | Tanner et al. |
| 2005/0021397 A1 | 1/2005 | Cui et al. |
| 2005/0050027 A1 | 3/2005 | Yeh et al. |
| 2005/0086579 A1 | 4/2005 | Leitner et al. |
| 2005/0144067 A1 | 6/2005 | Farahat et al. |
| 2005/0192008 A1 | 9/2005 | Desai et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0251820 A1 | 11/2005 | Stefanik et al. |
| 2005/0278743 A1 | 12/2005 | Flickinger et al. |
| 2005/0288954 A1 | 12/2005 | McCarthy et al. |
| 2005/0288998 A1 | 12/2005 | Verma et al. |
| 2006/0004731 A1 | 1/2006 | Seibel et al. |
| 2006/0041443 A1 | 2/2006 | Horvath |
| 2006/0080233 A1 | 4/2006 | Mendelovich et al. |
| 2006/0080251 A1 | 4/2006 | Fried et al. |
| 2006/0122921 A1 | 6/2006 | Comerford et al. |
| 2006/0206379 A1 | 9/2006 | Rosenberg |
| 2006/0212353 A1 | 9/2006 | Roslov et al. |
| 2006/0224696 A1 | 10/2006 | King et al. |
| 2006/0229943 A1 | 10/2006 | Mathias et al. |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0253323 A1 | 11/2006 | Phan et al. |
| 2006/0259364 A1* | 11/2006 | Strock et al. .................... 705/14 |
| 2006/0267999 A1 | 11/2006 | Cash et al. |
| 2006/0282359 A1 | 12/2006 | Nobili et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293932 A1 | 12/2006 | Cash et al. |
| 2006/0293954 A1 | 12/2006 | Anderson et al. |
| 2006/0293955 A1 | 12/2006 | Wilson et al. |
| 2006/0293979 A1 | 12/2006 | Cash et al. |
| 2006/0294199 A1 | 12/2006 | Bertholf |
| 2007/0011020 A1 | 1/2007 | Martin |
| 2007/0011039 A1 | 1/2007 | Oddo |
| 2007/0016518 A1* | 1/2007 | Atkinson et al. ................ 705/38 |
| 2007/0022032 A1 | 1/2007 | Anderson et al. |
| 2007/0027778 A1 | 2/2007 | Schellhammer et al. |
| 2007/0030282 A1 | 2/2007 | Cash et al. |
| 2007/0033227 A1 | 2/2007 | Gaito et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0156515 A1 | 7/2007 | Hasselback et al. |
| 2007/0174122 A1 | 7/2007 | Howard et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0220611 A1 | 9/2007 | Socolow et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0282684 A1 | 12/2007 | Prosser et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0299771 A1* | 12/2007 | Brody et al. .................... 705/38 |
| 2008/0005313 A1 | 1/2008 | Flake et al. |
| 2008/0010206 A1 | 1/2008 | Coleman |
| 2008/0028067 A1 | 1/2008 | Berkhin et al. |
| 2008/0059317 A1 | 3/2008 | Chandran et al. |
| 2008/0065774 A1 | 3/2008 | Keeler |
| 2008/0086368 A1 | 4/2008 | Bauman et al. |
| 2008/0097928 A1 | 4/2008 | Paulson |
| 2008/0120155 A1 | 5/2008 | Pliha |
| 2008/0120569 A1 | 5/2008 | Mann et al. |
| 2008/0133325 A1 | 6/2008 | De et al. |
| 2008/0177836 A1 | 7/2008 | Bennett |
| 2008/0184289 A1 | 7/2008 | Cristofalo et al. |
| 2008/0215470 A1 | 9/2008 | Sengupta et al. |
| 2008/0228635 A1 | 9/2008 | Megdal et al. |
| 2008/0255897 A1 | 10/2008 | Megdal et al. |
| 2008/0276271 A1 | 11/2008 | Anderson et al. |
| 2008/0294540 A1 | 11/2008 | Celka et al. |
| 2008/0301727 A1 | 12/2008 | Cristofalo et al. |
| 2009/0018996 A1 | 1/2009 | Hunt et al. |
| 2009/0044246 A1 | 2/2009 | Sheehan et al. |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094640 A1 | 4/2009 | Anderson et al. |
| 2009/0133058 A1 | 5/2009 | Kouritzin et al. |
| 2009/0144201 A1 | 6/2009 | Gierkink et al. |
| 2009/0177480 A1 | 7/2009 | Chen et al. |
| 2009/0222380 A1 | 9/2009 | Choudhuri et al. |
| 2009/0228918 A1 | 9/2009 | Rolff et al. |
| 2009/0271248 A1 | 10/2009 | Sherman et al. |
| 2009/0288109 A1 | 11/2009 | Downey et al. |
| 2009/0313163 A1 | 12/2009 | Wang et al. |
| 2010/0037255 A1 | 2/2010 | Sheehan et al. |
| 2010/0138290 A1 | 6/2010 | Zschocke et al. |
| 2010/0268660 A1 | 10/2010 | Ekdahl |
| 2011/0029388 A1 | 2/2011 | Kendall et al. |
| 2011/0060905 A1 | 3/2011 | Stack et al. |
| 2011/0164746 A1 | 7/2011 | Nice et al. |
| 2011/0213641 A1 | 9/2011 | Metzger, II et al. |
| 2011/0219421 A1 | 9/2011 | Ullman et al. |
| 2011/0307397 A1 | 12/2011 | Benmbarek |
| 2012/0047219 A1 | 2/2012 | Feng et al. |
| 2012/0066065 A1 | 3/2012 | Switzer |
| 2012/0124498 A1 | 5/2012 | Santoro et al. |
| 2012/0173339 A1 | 7/2012 | Flynt et al. |
| 2013/0066676 A1 | 3/2013 | Williams et al. |
| 2013/0080315 A1 | 3/2013 | Torrez et al. |
| 2013/0218638 A1 | 8/2013 | Kilger et al. |

FOREIGN PATENT DOCUMENTS

| | | |
|---|---|---|
| EP | 1122664 A2 | 8/2001 |
| WO | WO 97/23838 | 7/1997 |
| WO | WO 99/04350 | 1/1999 |
| WO | WO 00/55789 A2 | 9/2000 |
| WO | WO 00/55790 A2 | 9/2000 |
| WO | WO 01/11522 A2 | 2/2001 |
| WO | WO 01/75754 | 10/2001 |
| WO | WO 03/101123 A2 | 12/2003 |
| WO | WO 2004/114160 | 12/2004 |
| WO | WO 2005/022348 | 10/2005 |
| WO | WO 2007/149941 A2 | 12/2007 |
| WO | WO 2009/132114 | 10/2009 |
| WO | WO 2010/062537 | 6/2010 |
| WO | WO 2010/132492 | 11/2010 |

OTHER PUBLICATIONS

Experian Information Solutions, Inc., "Experian Launches Portfolio Monitor—Owner Notices[SM]", News Release, Feb. 2003, Costa Mesa, CA.

Eric Anderson, "System Administration: Monitoring, Diagnosing, and Repairing", Apr. 7, 1997, available at http://now.cs.berkeley.edu/Sysadmin/quals.

"Chase Gets Positive", Bank Technology News, May 6, 2000, v 14, n 5, p. 33.

Philip Brown and Peter Goldschmidt, "ALCOD IDSS: Assisting the Australian Stock Market Surveillance Team's Review Process", Applied Artificial Intelligence Journal, Dec. 1, 1996, pp. 625-641.

(56) References Cited

OTHER PUBLICATIONS

Shelby Gilje, "Keeping Tabs on Businesses That Keep Tabs on Us", Seattle Times, Apr. 19, 1995, Scene Section.
Tracey Longo, "Managing Money: Your Family Finances", Kiplinger's Personal Finance Magazine, Jun. 1, 1995, vol. 49, Issue 6.
Business Wire, Inc., "Bank of America Direct Web-Based Network Adds Core Functionality to Meet Day-To-Day Treasury Needs", Business Wire, Oct. 25, 1999.
Business Wire, Inc., "Cole Taylor Bank Chooses Integrated E-Banking/E-Payments/Reconciliation Solution From Fundtech", Business Wire, Oct. 21, 1999.
Kerry G. Hill, "Identity Theft Your Social Security Number Provides Avenue for Thieves", Wisconsin State Journal, Sep. 13, 1998, Forum Section.
Federal Trade Commission, "FTC Testifies: Identity Theft on the Rise", FTC News Release, Mar. 7, 2000.
Caliendo, et al., "Some Practical Guidance for the Implementation of Propensity Score Matching", IZA: Discussion Paper Series, No. 1588, Germany, May 2005, pp. 32.
CreditAnalyst, Digital Matrix Systems, as printed out Mar. 4, 2008, pp. 2.
Egol, Len; "What's New in Database Marketing Software," Direct, Aug. 1994, vol. 6, No. 8, p. 39(4).
Fanelli, Marc, "Building a Holistic Customer View", MultiChannel Merchant, Jun. 26, 2006, pp. 2.
"Intelligent Miner Applications Guide", IBM Corp., Apr. 2, 1999, Chapters 4-7, pp. 33-132.
International Search Report and Written Opinion for Application No. PCT/US10/34434, dated Jun. 23, 2010.
Lamons, Bob, "Be Smart: Offer Inquiry Qualification Services," Marketing News, ABI/Inforrn Global, Nov. 6, 1995, vol. 29, No. 23, pp. 13.
"Parse", Definition from PC Magazine Encyclopedia, http://www/pcmag.com/encyclopedia_term_0,2542,t=parse&i=48862,00.asp as downloaded Mar. 5, 2012.
Tao, Lixin, "Shifting Paradigms with the Application Service Provider Model"; Concordia University, IEEE, Oct. 2001, Canada.
Thoemmes, Felix, "Propensity Score Matching in SPSS", Center for Educational Science and Psychology, University of Tübingen, Jan. 2012.
"Accenture Completes Acquisition of Media Audits: Acquisition Expands Company's Marketing Sciences and Data Services Capabilities," Accenture.Com, Dec. 12, 2005, 2 pages, http://accenture.tekgroup.com/article_display.cfm?article_id=4282.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
Adweek, "Aim High: Ad Targeting Moves to the Next Level," dated Jan. 21, 2008 as downloaded from http://www.adweek.com/aw/magazine/article_display.isp?vnu on Apr. 16, 2008.
Adzilla, Press Release, "ZILLACASTING technology approved and patent pending," dated May 16, 2005 as downloaded from http://www.adzilla.com/newsroom/pdf/patent_051605.pdf on May 28, 2008.
AFX New Limited—AFX International Focus, "Nielsen moving to measure off-TV viewing," Jun. 14, 2006, 1 page.
Andrew Reinbach, MCIF aids banks in CRA compliance, Bank Systems & Technology, vol. 32, No. 8, pp. 27, Aug. 1995.
"Arbitron 2006 Black Consumers," Arbitron Inc., LVTSG.COM, Jul. 8, 2006, 2 pages, http://www.lvtsg.com/news/publish/Factoids/article_3648.shtml.
"Atlas on Demand and C-COR Join Forces to Offer Advertising Management Solution for on Demand TV: Global Provider of on Demand Systems Partners with Atlas to Develop and Market Comprehensive VOD Advertising Solution," Atlassolutions.Com, Jul. 25, 2005, 3 pages.
Atlas on Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar Jun. 22, 2006 - 3 pages, http://www.atlassolutions.com/news_20060622.aspx.
"Atlas on Demand, Concurrent, and Everstream Strike Video-On-Demand Advertising Alliance", Atlassolutions.Com, Jul. 13, 2006, 3 pages.
Bachman, Katy, "Arbitron, VNU Launch Apollo Project," Mediaweek.Com Jan. 17, 2006, 3 pages, http://www.mediaweek.com/mw/search/article_display.jsp?schema=&vnu_content_id=1001847353.
"Cable Solution Now, The Industry Standard for Information Management: Strata's TIM.net Crosses Important Threshold Dominant Solution for All Top 20 TV Markets," Stratag.Com, Apr. 28, 2006, 1 page, http://stratag.com/news/cablepress042806.html.
"Claritas Forms Life Insurance Consortium with Worldwide Financial Services Association: Initiative with LIMRA International is First of its Kind to Provide Actual Sales Information at Small Geographic Areas," Claritas.Com, Feb. 9, 2006, 3 pages, http.
"Claritas Introduces PRIZM NE Consumer Electronic Monitor Profiles: New Information Product Provides Insight Into the Public's Purchasing Behaviors of Consumer Electronics," Claritas.Com May 30, 2006, 3 pages.
Click Z, "ISPs Collect User Data for Behavioral Ad Targeting," dated Jan. 3, 2008 as downloaded from http://www.clickz.com/showPage.html?page=clickz on Apr. 16, 2008.
CNET News.Com, "Target me with your ads, please," dated Dec. 5, 2007 as downloaded from http://www.news.com/2102-1024_3-6221241.html?tag+st.util.print on Mar. 18, 2008.
Creamer, Matthew, "Consulting in marketing; Accenture, others playing role in firms' processes," Crain's Chicago Business, Jun. 12, 2006, 2 pages, Crain Communications.
Delany, Kevin J., et al. Firm Mines Offline Data to Target Online Ads; Commercial Alert Oct. 17, 2007; as downloaded from http://www.commercialalert.org on Apr. 22, 2008.
Demographicsnow.Com, sample reports, "Age Rank Report", Jul. 17, 2006, 3 pages.
Demographicsnow.Com, sample reports, "Consumer Expenditure Summary Report", Jul. 17, 2006, 3 pages.
Demographicsnow.Com, sample reports, "Income Comparison Report", Jul. 17, 2006, 4 pages.
"Epsilon Leads Discussion on Paradigm Shift in TV Advertising," Epsilon.Com, Jun. 24, 2004, 2 pages, http://www.epsilon.com/who-pr_tvad040624.html.
Front Porch Brochure, "Ad Networks—Partner with Front Porch!: Our Internet-Wide Behavioral Targeting Brings Ad Networks Higher Revenue", 2 pages (Publication date unknown, copyright date is 2008).
Front Porch Brochure, "New Free Revenue for Broadband ISPs!: Get your share of the $20 billion online advertising market!", 2 pages. (Publication date is unknown, copyright date is 2008).
Fusun Gonul et al., "Optimal Mailing of Catalogs: A New Methodology Using Estimable Structural Dynamic Programming Models", 14 pages, Management Science, vol. 44, No. 9, Sep. 1998.
Gabriel Bitran et al., "Mailing Decisions in Catalog Sales Industry", Management Science, vol. 42, No. 9, Sep. 1996, pp. 1364-1381.
GR Bitran, SV Mondschein—Management Science, 1996—JSTOR Mailing Decisions in the Catalog Sales Industry, Gabriel R. Bitram, Susana V. Mondschein. Management Sciencem vol. 42, No. 9, 1364-81, Sep. 1996.
Hakan Polatoglua and Izzet Sahinb, Probability distributions of cost, revenue and profit over a warranty cycle, European Journal of Operational Research, vol. 108, Issue 1. Jul. 1, 1998, p. 170-83.
Halliday, Jean, "Ford recruits Accenture for marketing plan," Automotive News Feb. 13, 2006, 2 pages, Crain Communications.
Haughton, Dominique et al., "Direct Marketing Modeling with CART and CHAID", Journal of Direct Marketing, vol. 11, No. 4, Fall 1997, p. 42-52.
Helm, Burt, "Nielsen's New Ratings Yardstick," Businessweek.Com, Jun. 20, 2006, 3 pages, http://www.businessweek.com/technology/content/jun2006/tc20060620_054223.htm.

(56) References Cited

OTHER PUBLICATIONS

Hinman, Donald P., "The Perfect Storm: Response Metrics and Digital TV," Chiefmarketer.Com, May 17, 2006, 2 pages, http://www.chiefmarketer.com/crm_loop/roi/perfect-storm-051706/index.html.

Information Resources, Inc. and Navic Networks Form Joint Relationship to Support Next Generation of Technology for Advertising Testing, IRI Expands BehaviorScan® Solution to Meet Digital and On-demand Needs, Infores.Com, Feb. 27, 2006, 2 pages, http://us.infores.com/page/news/pr/prearchive?mode=single<_id=117.

International Search Report and Written Opinion for PCT/US 08/83939, filed on Nov. 18, 2008, in 12 pages.

International Search Report and Written Opinion in PCT Application No. PCT/US2007/21815; Dated Sep. 5, 2008 in 11 pages.

"Instant Rules GUI", http://www.zootweb.com/business_rules_GUI.html, printed on Mar. 3, 2008, in 1 page.

"IRI and Acxiom Introduce More Efficient and Actionable Approach to Consumer Segmentation and Targeted Marketing," Eu-Marketingportal.DE, Jan. 26, 2006, 2 pages, http://www.eu-marketingportal.de.

Jan Roelf Bult et al., "Optimal Selection for Direct Mail", Marketing Science, vol. 14, No. 4, 1995, pp. 378-394.

Jost, Allen, Neural Networks, Credit World, Mar./Apr. 1993, vol. 81, Issue 4, pp. 26-33.

"Mediamark Research Inc. Releases Findings From Mobile Marketing Consumer Study; Outback Steakhouse and Royal Caribbean Cruise Lines Among Brands Participating in Mobile Marketing Research," Thefreelibrary.Com, May 9, 2006, 4 pages, http://thefreelibrary.com.

Muus, Lars et al., "A decision theoretic framework for profit maximization in direct marketing", 20 pages, Sep. 1996.

NebuAD, Wall Street Journal Online, "Venture Capital: What's New", Oct. 22, 2007, 2 pages, http://www.nebuad.com/company/media_coverage/media_10_22_07.php.

Otter, Pieter et al., "Direct mail selection by joint modeling of the probability and quantity of response", 14 pages, Jun. 1997.

"Pre-Built Standard Attributes", http://www.zootweb.com/credit_attributes.html, printed Mar. 3, 2008, in 1 page.

Phorm, "The Open Internet Exchange", 2 pages, http://www.phorm.com/oix (Publication date unknown, copyright date 2008).

Phorm, Press Release Regarding Exclusive Agreements, 2 pages, Feb. 14, 2008, http://www.phorm.com/about/launch_agreement.php.

Predictive Behavioral Targeting as downloaded from http://www.predictive-behavioral-targeting.com/index.php.Main_Page on Mar. 28, 2008.

Rap Interactive, Inc. and Web Decisions, "LiveDecisions", 2 pages, Publication date unknown.

"Rules Management GUI", http://www.zootweb.com/instant_rules_GUI.html, printed on Mar. 3, 2008, in 1 page.

Schmittlein, David C. et al., "Customer Base Analysis: An Industrial Purchase Process Application", Marketing Science, vol. 13, No. 1 (Winter 1994), p. 41-67.

"SRC Delivers Industry's First Drive Time Engine Developed to Follow Actual Road Networks," Thomasnet.Com, May 21, 2006, 4 pages, http://news.thomasnet.com/companystory/485722.

"SRC Announces Free Dashups to Mashups Adding Geographic Business Intelligence at Web Speed to the Enterprise on www.FreeDemographics.com/API," Directionsmag.Com, Jun. 12, 2006, 3 pages, http://www.directionsmag.com/press.releases/index.php?duty=Show&id=14532&trv=1.

Sweat, Jeff, "Know Your Customers", Information Week, Nov. 30, 1998, pp. 20.

UPI, "Nielsen Media Research goes electronic," Jun. 14, 2006, 1 page.

"VOD Integration Now Available in Strata: Buyers / Sellers Benefit from VOD Component on Popular Platform," Stratag.Com, Feb. 21, 2006, 1 page, http://www.stratag.com/news/mediapress022106.html.

Whitney, Daisy, "Atlas Positioning to Shoulder VOD Ads; Campaign Management Tools Optimize Inventory," TelevisionWeek, May 23, 2005, 3 pages.

\* cited by examiner

MASTER PRE-SCREEN LIST 240

| CONSUMER PIN | CONSUMER NAME | CLIENT1/ CAMPAIGN1 | CLIENT1/ CAMPAIGN2 | ... | CLIENT N/ CAMPAIGN M | APPENDED CONSUMER DATA |
|---|---|---|---|---|---|---|
| 101332 | John Doe | X | X | | | Mailing Address, Phone Number, Credit Score, Credit Balance |
| 127691 | Mary Doe | X | X | | | Mailing Address, Phone Number, Credit Score, Credit Balance |
| 032596 | Henry Lee | X | X | | | Phone Number, Credit Balance |
| 558971 | Tom Smith | X | | | X | Mailing Address, Credit Score, Payments left on Auto Loan |
| 872361 | Jill Johnson | X | | | | Mailing Address, Credit Score |

FIG. 3

DAILY OCCURRENCES LIST

| INFORMANT ID | OCCURRENCE TYPE | CONSUMER NAME | CONSUMER PIN |
|---|---|---|---|
| ABC BANK | | | |
| | Mortgage Inquiry | Tom Smith | 558971 |
| | | Jill Johnson | 872361 |
| | | Alan Brown | 058219 |
| | Home Equity Inquiry | John Doe | 101173 |
| | | Tina Doe | 689275 |
| | | Grant Perkins | 121171 |
| CORNER AUTO LOT | | | |
| | Auto Equity Inquiry | Donna Brown | 259937 |
| | | Sara Bronson | 091885 |
| | | | |
| | | | |
| | | | |
| | | | |
| | | | |
| | | | |

FIG. 4

PROSPECT TRIGGERS HISTORICAL LOG

| CONSUMER PIN | CLIENT/CAMPAIGN ID | TRIGGER NOTIFICATION SENT |
|---|---|---|
| 509937 | Bank123/ Home Equity 1 | 06-17-04 |
| 509937 | CarsRUs/ Fall 2004 Auto Loan | 08-07-04 |
| 173102 | CarsRUs/ Fall 2004 Auto Loan | 12-01-03 |
| 173102 | Bank123/ Home Equity 2 | 06-22-04 |
| 173102 | AutoNow/ Pre-Sale Mailer | 09-24-04 |
| 831924 | Bank123/ Home Equity 1 | 11-05-04 |
| 831924 | ABCBank/ Platinum Phone Campaign | 10-29-04 |
| 010100 | ABCBank/ Gold Phone Campaign | 6-23-04 |
| 830556 | Bank123/ Home Equity 1 | 10-11-04 |
| 830556 | CarsRUs/ Fall 2004 Auto Loan | 11-27-04 |
| | | |
| | | |

FIG. 5

AUTOMATED ANALYSIS OF DATA TO GENERATE PROSPECT NOTIFICATIONS BASED ON TRIGGER EVENTS

PRIORITY CLAIM

This application claims the benefit of priority under 35 U.S.C. §119(e) of U.S. Provisional Application No. 60/612,313, filed on Sep. 22, 2004 and entitled AUTOMATED ANALYSIS OF CONSUMER DATA TO GENERATE PROSPECT NOTIFICATIONS BASED ON TRIGGER EVENTS, the entirety of which is incorporated herein by reference.

FIELD OF THE INVENTION

One embodiment of the invention relates to systems and methods for monitoring changes in a database and, in particular, for monitoring changes to a selected subset of records in the database.

BACKGROUND OF THE INVENTION

Consumer credit databases, such as those maintained by companies who calculate credit scores, are typically enormous in size and are continually updated to reflect very recent consumer activity details for hundreds of millions of consumers. Many lenders, merchants, and other providers of credit-related products desire to exploit the wealth of data available in these databases. In particular, credit-providers would find it very advantageous to exploit the databases in order to improve or replace, at least in part, their blanket marketing campaigns, in which the credit-providers send out advertisements, make cold phone calls, or otherwise contact large numbers of consumers, based on general selection criteria, with offers of their credit-related products and/or services, in hopes that at least a portion of the contacted consumers will respond to their offers. Unfortunately, such blanket advertisement campaigns often reach consumers who are not eligible for the offers or who are not actively interested in extensions of credit and are therefore less motivated to seriously consider a lender's offer. Industry research indicates that less than 0.1% of contacts made in such blanket campaigns result in a sale.

Information in the consumer credit databases could help the credit-providers identify potentially interested and credit-worthy customers. However, several technical, database-related obstacles have kept credit providers from fully utilizing the potential of the information available from the consumer credit databases. For one, the consumer credit databases are typically organized and optimized for quick extraction of simple bits of information about individual consumers, such as individual credit scores, while allowing the database to continually insert incoming consumer data into its records.

Out of an abundance of caution, credit-providers often prefer to have complex, computationally-expensive, and time-consuming analyses and classifications performed on the database records as part of their identification of prospective customers, in an effort to avoid making the firm offer of credit that is mandated by the Fair Credit Reporting Act (FCRA) to consumers who may later in the process be revealed as being undesirable credit risks.

Furthermore, even if a solution could be found to reconcile the conflicting needs for a constantly available database of individual consumer credit-related activity versus one that allows for time-consuming and complex analytical classifications of consumers, neither model allows the credit provider to make use of newly received information from the last twenty-four hours to identify consumers who are both eligible for a firm offer of credit and are currently interested in obtaining additional credit.

SUMMARY OF THE INVENTION

Embodiments of systems and methods are described for automatically analyzing information from an online consumer credit database in order to identify consumers who both meet a credit-provider's criteria for making a firm offer of credit and are also deemed, based on extremely recent indications in the database, known as trigger events, to be currently interested in obtaining credit. The systems and methods further generate timely notifications of the identified prospective customers to the credit-provider. In certain embodiments, the prospect notifications may be generated daily, multiple times per day, or at another advantageous frequency, and may thus more accurately identify consumers who are likely to be currently interested in specific products and/or services.

Systems and methods are described for identifying a subset of interest from a general population and for monitoring a database of daily activity logs associated with the general population in order to identify database entries indicative of an occurrence of a pre-defined trigger event that is associated with a member of the subset of interest. In particular, systems and methods are described that allow a massive database of daily activity logs to be monitored to identify trigger events that have occurred within the past twenty-four hours or other very recent time period. Embodiments are described that may be advantageously used by a provider of credit-related products and/or services who wishes to accurately target prospective customers, identified by the system, based on occurrence of a trigger event, as being in a decision-making phase of credit shopping, for purposes of making a timely and targeted offering relevant to the customers' current activities.

In one embodiment, where clients are entities such as lenders and other providers of credit-related products and services, a subset of the consumer population is identified as meeting a client's set of pre-screen criteria that define, for example, consumers to whom the client would be willing to make a firm offer of credit. Daily credit-related events associated with members of the subset are monitored so that when a pre-determined event, such as a credit-related inquiry, takes place with respect to a member of the subset, the lender is notified and may take a desired action. For example, the lender may wish to present an offer of pre-approved credit to the identified member(s) of the population subset for whom a trigger event has been identified.

An embodiment of an electronic system for providing notifications about credit-related events is described. The system includes: an electronic list of consumers, a database of credit-related information, an electronic set of campaign criteria, and an automated selection system. The electronic list of consumers identifies consumers who have been pre-screened to be eligible for a firm offer of credit. The database of credit-related information includes data about consumers that is updated at least daily to include information about events that have occurred since a last update of the database, wherein the events include events of at least one of the following types: newly-established consumer credit relationships, consumer credit inquiries, and consumer line-of-credit events. The electronic set of campaign criteria describes at least one type of event that is of interest to an entity associated with an offer of credit. The automated selection system is configured to monitor the database at least daily and to identify consumers on the list who are associated with newly-added inquiries or new credit relationships which are of the at least one type of event described in the set of campaign criteria. In some embodiments, the system includes a prospect list generation system that receives a list of the consumers identified each day by the selection system and that makes the list available to the entity associated with the offer of credit.

An embodiment of a computer-implemented method of providing notifications about credit-related occurrences is described. The method comprises: (a) obtaining an electronic list of consumers who meet a set of pre-screen criteria for an offer of credit; (b) monitoring a database of consumer credit-related events to identify credit-related occurrences associated with one or more consumers on the list, wherein the occurrences have been added to the database within a time period of interest; and (c) providing a notification of the consumers associated with the identified credit-related occurrences.

An embodiment of a method of providing notifications about credit-related events is described. The method includes obtaining a list of names of consumers who meet a set of pre-screen criteria for a credit offer and receiving information that identifies one or more types of credit-related events as indicating that a consumer is currently interested in obtaining credit. The method further includes monitoring a database of consumer credit-related events that is updated at least daily to identify credit-related events associated with one or more names on the list, wherein the events have been added to the database within a time period of interest, and providing a notification of the names associated with the identified credit-related events.

An embodiment of a system for providing notifications about credit-related events is described. The system includes: a pre-screen list generation system, a database of credit-related information about consumers, a set of campaign criteria, and a prospect list generation system. The pre-screen list generation system is configured to receive from a credit-provider a set of eligibility criteria. The pre-screen list generation system is further configured to use the eligibility criteria to identify consumers listed in a consumer database who are eligible for a firm offer of credit from the credit-provider and to generate a pre-screen list of the identified names. The database of credit-related information about consumers is updated at least daily to include information about events that have occurred since a last update of the database, wherein the events include newly-established consumer credit relationships and inquiries about a consumer's credit score. The set of campaign criteria describes at least one type of event that is of interest to the credit-provider as being indicative of a consumer's current interest in obtaining credit. The selection system is configured to monitor the database and capture results at least daily and to identify consumers on the pre-screen list who are associated with one or more events that have been added to the database since a last monitoring, the events being of a type described in the campaign criteria. The prospect list generation system receives a list of the consumers identified each day by the selection system and makes the list available to the entity wishing to offer credit.

Neither this summary nor the following detailed description defines or limits the invention. The invention is defined by the claims.

BRIEF DESCRIPTION OF THE DRAWING

A general architecture that implements various features of specific embodiments of the invention will now be described with reference to the drawings. The drawings and the associated descriptions are provided to illustrate embodiments of the invention and not to limit the scope of the invention.

FIG. 3 depicts an example of a master pre-screen list.

FIG. 4 depicts an example of a list of daily occurrences.

FIG. 5 depicts an example of a prospect triggers historical log.

DETAILED DESCRIPTION OF THE PREFERRED EMBODIMENT

The following description discloses several embodiments of a computer-implemented system for automatically analyzing large quantities of credit-related consumer data on a daily or other frequent basis in accordance with processing instructions that are customized to suit a client's promotional campaign. In a preferred embodiment, the system is configured to generate a daily list (or multiple lists per day) of consumer names and related data useful for efficiently executing an advertising campaign based on recent inputs to a database of consumer activity.

Figure 1A:
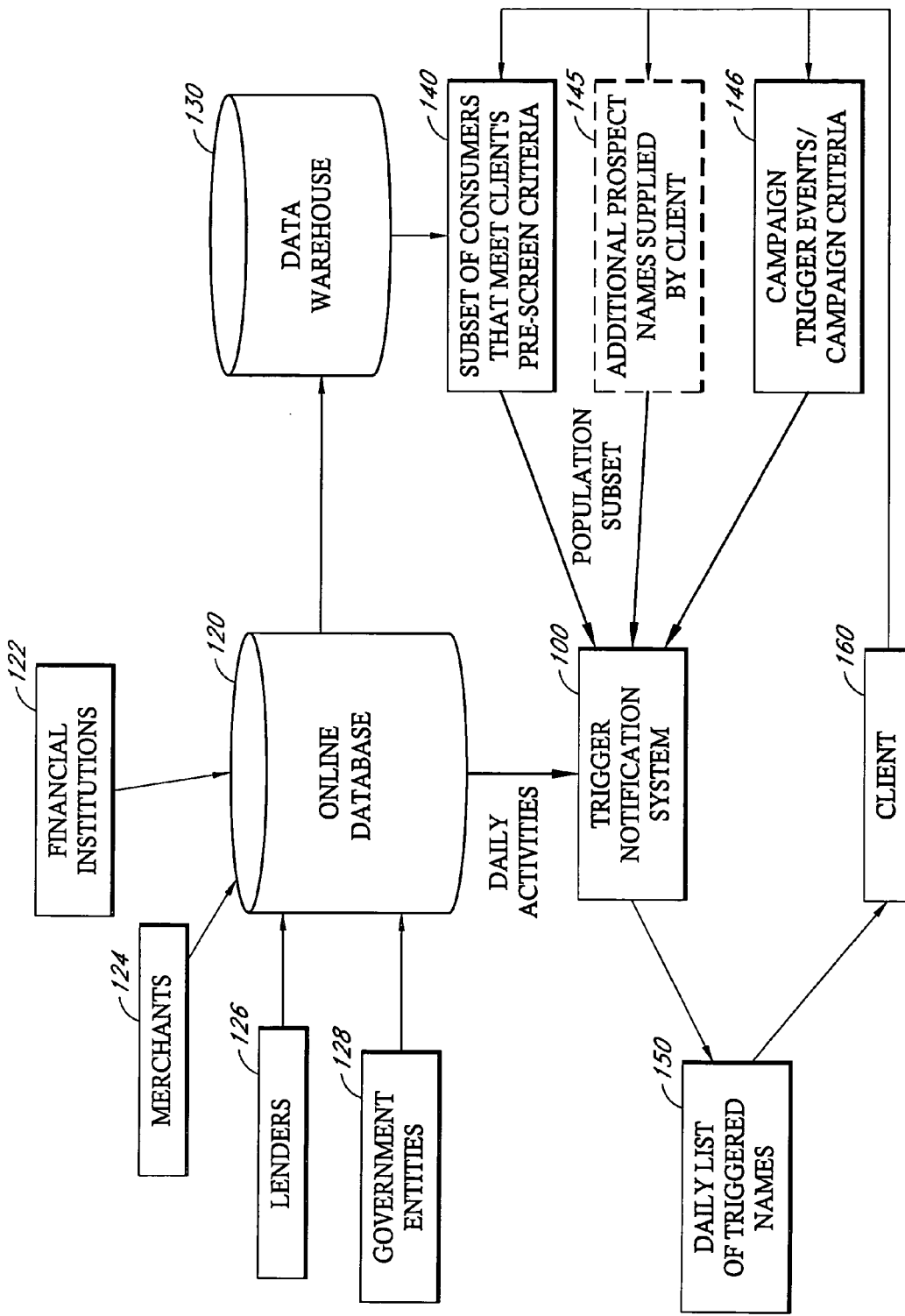
FIG. 1A is a block diagram that depicts a high-level overview of one embodiment of a system for generating prospect notifications.

FIG. 1A is a block diagram that depicts a high-level overview of one embodiment of a system for automatically analyzing consumer data to generate prospect notifications based on trigger events. Credit-providers may want to offer credit to consumers with whom they do not currently have a business relationship. In particular, credit providers would like to identify consumers who are both credit-worthy and currently interested in obtaining additional credit. The credit-providers undertake advertising campaigns to reach such consumers in which a specific type of credit offer is promoted. Although a credit-provider can currently purchase or otherwise acquire lists of consumer names and their contact information, these names may not represent likely prospects for the credit-provider's offers if the consumers on the list are not currently interested in obtaining additional credit.

However, if the credit-provider is able to identify one or more consumer activities that signal a greater likelihood of interest in obtaining credit on the part of a consumer who is in the market for credit, and if the credit-provider is able to receive timely information about the occurrence of such consumer activities, then the credit-provider can more effectively make use of resources expended during a promotional campaign by targeting consumers identified as having recently been involved in such activities. In other words, automatic recognition of an occurrence of such an identified consumer activity may serve as a trigger to notify a credit-provider or other interested party that an identified consumer is currently a good prospect for their promotional offer.

A computer system that is capable of processing massive quantities of data with the speed needed to identify daily triggers provides an important informational advantage to a credit-provider or other client of the system. A credit-provider may possess such a computer system, or, more frequently, may become a client of a business entity that has access to massive computer resources and to credit-related information and that offers such daily prospect trigger notifications.

Current government regulations that protect consumers from unwarranted financial surveillance and from unfair use of personal information may impose additional restrictions on the computer-implemented system for providing daily notifications based on prospect triggers notifications. For example, current federal regulations require that a firm offer of credit must be extended to every consumer whose name is included in a file that is generated by monitoring daily credit-related consumer activities. In order to be of commercial value to credit-providers, while at the same time complying with government regulations, the computer-implemented prospect trigger notification system first analyzes stored consumer data, which is frequently about consumers with whom the credit-provider does not currently have a business relationship, in order to exclude those consumers who do not meet a set of criteria that define consumers to whom the client is willing to extend a firm offer of credit.

FIG. 1A depicts a trigger notification system 100 that receives one or more lists 140, 145 which identify consumers who meet a client's set of pre-screen criteria for receiving a firm offer of credit. The trigger notification system 100 also receives, from an online database 120 that stores information about the credit-related activities of millions of consumers, a set of recently updates to the online database 120. The trigger notification system 100 compares the list of identified consumers with the list of recent activity updates, as will be described in greater detail in the present disclosure, to generate prospect notifications based on trigger events.

As depicted in FIG. 1A, an online database 120 stores data about a large population of consumers, for example, two hundred and sixty million consumers. The online database 120 dynamically receives and stores input from financial institutions 122, from merchants 124, from lenders 126, and from government entities 128 around the clock. In other embodiments, the online database 120 may additionally or alternatively receive input from other sources. The credit-related input may include information associated with credit relationships, credit inquiries, and public records. For example, entries in the online database 120 may include information about: changes to account balances, account payment histories including notices of overdue accounts, credit rating inquiries, new lines of credit opened, credit line limit increases, credit line over-limits, address changes, judgments, liens, and bankruptcies. In one embodiment, the database 120 serves as a primary source of information for generating consumer credit ratings.

The online database 120 may be implemented using one or more mainframe computers, mini-computers, personal computers configured as a server farm, or other suitably configured set of computers with sufficient storage and processing capacities.

In a preferred embodiment, the online database 120 is configured as a relational database comprising a plurality of tables, as will be described in greater detail with reference to FIG. 1B.

Information from the online database 120 is processed and used to generate a data warehouse 130 for a population of consumers. The information may represent a "snapshot" of the information in the online database 120 and may be periodically updated, such as monthly, weekly, twice weekly, or according to another desired schedule. The data warehouse 130 may process the data from the online database 120, and may include additional data not found in the online database 120, in order to facilitate in-depth analysis of the data for a variety of credit-related and other purposes without disturbing normal functioning of online database 120. For example, some or all of the data from the online database 120 may be verified for accuracy before being entered into the data warehouse 130. Additional information associated with individual consumers, such as demographic information, employment information, and other information of interest for credit-related purposes may be added to the data warehouse 130.

In a preferred embodiment, the data warehouse 130 is implemented as a relational database, although data in the data warehouse 130 may be organized differently than data in the online database 120. The data warehouse 130 may be implemented using one or more mainframe computers or other suitably configured set of computers with sufficient storage and processing capacities. Furthermore, although the online database 120 and the data warehouse 130 have each been depicted in FIG. 1A as a single, unified database, in various embodiments, one or both of the repositories 120, 130 may be distributed across a variety of hardware and/or software components that may be located in one location or in a plurality of physical locations.

One embodiment of the data warehouse 130 is described in the co-owned and co-pending U.S. patent application Ser. No. 11/103,659, filed on Apr. 11, 2005, and entitled SYSTEMS AND METHODS FOR OPTIMIZING DATABASE QUERIES, the disclosure of which is hereby incorporated herein by reference in its entirety.

As described above, a client 160 may be a business entity that wishes to undertake a sales campaign or other promotional activity. In order to generate a list of consumers with whom a credit-provider does not currently have a business relationship, but to whom the credit-provider is willing to make a firm offer of credit, a sub-population of interest is identified from the records of the data warehouse 130. In some embodiments, the sub-population of interest may be identified in order to generate a list of existing customers with whom a new credit relationship is desired.

For example, in a preferred embodiment, the client identifies a set of "pre-screen" criteria that define consumers who qualify for a firm offer of credit, such as for a car, home equity or other type of loan from the client. To continue the example, the client's pre-screen criteria may specify that consumers with credit ratings above a threshold value and who have had no repossessions on automobile loans are eligible for a firm offer of credit on an automobile loan. More frequently, clients may wish to specify pre-screen criteria that are much more complex in order to identify a desired target sub-set of the population.

Applying the client's pre-screen criteria to records in the data warehouse 130 generates a subset list 140 that includes a subset of consumer names from the data warehouse 130, for example, fifty million consumers out of two hundred and thirty million, who meet the client's pre-screen criteria. The subset list 140 may be regenerated monthly, or bi-weekly, or according to another periodic or other type of schedule, and may be based on an updated set of pre-screen criteria provided by the client 160. In some jurisdictions, government regulations require that pre-screen lists 140 be updated at a minimum frequency or more, such as at least every thirty or ninety days, in order to ensure that consumers are being selected for credit or other types of offers based on credit-related data that is current.

The trigger notification system 100, which is preferably implemented as a software package that is configured to run on general purpose computer equipment and to access records within the online database 120, receives a copy of a client's pre-screen subset list 140 and a set of one or more trigger events 146 of interest to the client 160. A trigger event is typically an event or occurrence that is logged in the online database 120 of daily consumer activities and that the client 160 wishes to use to identify consumers who may be actively shopping for specific products and/or services. For example, an inquiry regarding a consumer's credit score from a home mortgage provider may be an indication that the consumer is actively shopping for a mortgage. The trigger notification system 100 uses the subset list 140 and the client-provided set of trigger events 146 to monitor updates to the daily credit-related activity database 120 that are associated with consumers included in the pre-screen subset list 140.

A business entity that operates the trigger notification system 100 preferably serves many different clients 160, each interested in conducting its own promotional campaign(s), with its own pre-screen criteria and resultant subset list 140, as well as each with its own set of trigger events 146 and other campaign-related instructions. For ease of description, however, the descriptions of the systems and methods provided herein frequently refer to the client 160 in the singular. It will be appreciated that the business entity operating the trigger notification system 100 may provide the services described herein to a plurality of clients 160 at the same time.

The trigger notification system 100 monitors updates to the online database 120 associated with consumers on the subset list 140, as is described in greater detail with reference to FIGS. 6A and 6B. In particular, the trigger notification system 100 compares the updates from the online database 120 to the pre-screen subset list 140 and identifies those consumers from the subset list 140 who have been associated with a trigger event since a last monitoring of the online database 120. In some embodiments, the trigger notification system 100 makes use of date-stamps on records in the online database 120 in order to identify newly-occurring trigger events. In other embodiments, the trigger notification system 100 maintains records for consumers on the subset list 140, so that changes to a consumer's record may be noted.

The trigger notification system 100 compiles a list 150 of consumers from the subset list 140 whose associated records in the online database 120 indicate a current trigger event. The trigger notification system 100 preferably provides the client 160 with a daily, or more frequent, list of names 150 triggered within a recent short period of time, such as within the last twenty-four hours, so that the client 160 may quickly make use of the information that the identified consumers are currently good prospects for an offer of credit. In various embodiments, if requested by the client, the daily list of triggered names 150 may include, in addition to consumer names, identification of the one or more trigger events that occurred with respect to each consumer, as well as other identifying and/or contact information for the consumers on the list 150.

In some jurisdictions, legal regulations may further stipulate that, along with the daily list of triggered names 150, the trigger notification system 100 provides the client 160 with a consumer statement file, containing consumer statements of explanation associated with the contents of their credit files for any consumers included on the daily list of triggered names 150.

If requested by the client 160, the trigger notification system 100 may filter, sort, or otherwise modify the daily list of triggered names 150. For example, if a client 160 requests monitoring of more than one event trigger for the trigger notification system 100 to monitor, the trigger notification system 100 may group the identified consumer names 150 by the associated trigger. In situations where a given consumer is associated with more than one trigger event on the same day, the trigger notification system 100 may list the consumer in all appropriate groups or may list the consumer in only one group. For example, the client 160 may identify a hierarchy or other prioritized list of the trigger events and may request that triggered consumers be listed only with the trigger event of highest rank with which the consumer is associated on that day.

As another example, the client 160 may request that the trigger notification system 100 filter the daily set of triggered consumer names to exclude or identify a consumer who is repeatedly associated with a same trigger events within a given time span. For example, the client 160 may request that the trigger notification system 100 include the consumer's name in the daily list 150 only once or only once per week for a given trigger. Thus, if the online database 120 includes multiple inquiries associated with car loans for a given consumer over the span of two weeks, the consumer's name may appear on the daily list of triggered names 150 only the first time.

Furthermore, the client 160 may request that the trigger notification system 100 limit the daily list of triggered names 150 to only a pre-determined number of names, such as, for example, if the client 160 does not have the capacity to contact or otherwise make use of the full set of names in a timely manner. These and other modifications to the operation of the trigger notification system 100 will be appreciated by a skilled artisan as being within the scope of the invention as described herein.

In some embodiments, the client 160 communicates with the trigger notification system 100 via computer network, such as the Internet, and may be provided with a secure user interface, such as one or more web pages of a secure website that allow the client to input and/or modify triggers for use by the trigger notification system 100. In some embodiments, the client 160 may additionally or alternatively use a secure user interface, such as one or more web pages of a secure website to input and/or update the pre-screen criteria.

In some embodiments, the client 160 may also receive the daily list of triggered names 150 via secure Internet connection. In other embodiments, the client 160 and the trigger notification system 100 may communicate using T-1 or T-3 lines, or other dedicated or non-dedicated high-speed communications lines. Alternatively, clients 160 and the trigger notification system 100 may communicate using other data transmission systems and protocols. For example, clients 160 may receive their daily list of triggered names 150 as a text document or as a comma-delimited file transport protocol (FTP) transmission that may be downloaded into a spreadsheet application. In some embodiments, a portion of the communications between the client 160 and the trigger notification system 100 may be conducted in person, in writing, via telephone, or using other communication methods.

In some embodiments, the client 160 may provide a list of prospect names 145 for use by the trigger notification system 100. For example, the client 160 may provide a list 145 of current customers for whom the client 160 would like to identify additional credit relationship possibilities using the trigger notification system 120. As another example, the client 160 may provide a list 145 of consumers who have recently contacted them with credit-related questions but who have not entered into any business relationship with the client 160. As a third example, the client 160 may provide a list 145 that the client has purchased or otherwise acquired from another vendor. The trigger notification system 100 may use the client-provided list of prospect names 145 in addition to or as an alternative to the pre-screen subset list 140 as the list of names for whom triggered monitoring of the online database 120 is requested.

Government and other regulations may specify that consumers who wish not to be contacted for advertising purposes must be left off of contact lists generated for advertising purposes. In some jurisdictions, such consumers may express their desire by adding their name to an "opt-out/pander list" of people explicitly requesting not to be contacted with advertising offers. In various embodiments of the systems and methods described herein, verifying that such consumer names do not appear on the daily list of triggered names 150 supplied to the client 160 may be carried out by the trigger notifications system 100 and/or as part of the generation of the pre-screen subset list 140. Similarly, compliance with other regulations and legal requirements may be carried out by the trigger notification system 100 and/or by other components described herein.

In addition to or as an alternative to event-based triggers, the client 160 may identify other types of trigger occurrences of interest that may appear in the records of the online database 120. For example, the client 160 may be interested in identifying consumers whose credit balance is within a given amount or percentage of their credit limit or whose debt ratio has reached a threshold value. The client 160 may be interested in identifying consumers whose credit score has changed in value by a certain number of points or by a predetermined percentage within a given time. Furthermore, in some embodiments, the client 160 may categorize consumers according to "credit score bands," to which they belong by virtue of their credit score, such that a consumer may belong to the "600-650" band or to the "650-700" band based on their credit score. In such embodiments, the client 160 may wish to be notified of consumers who have moved from one credit score band to another within the last twenty-four hours or other recent period.

In some embodiments, information obtained as a result of the trigger notifications system's 100 monitoring of the online database 120 may be used as an input to an automated decisioning or learning system, in addition to or as an alternative to being used to provide the client 160 with a daily list of triggered names 150. In such embodiments, the automated decisioning or learning may be carried out by the trigger notification system 100 or another system component in communication with the trigger notification system 100 or by the client 160 or by another entity associated with the client 160, or by a combination of the above.

For example, in one embodiment, the clients 160 provide feedback data to the trigger notification system 100 regarding the success rates of their consumer contact campaigns that are based on trigger notifications 150. The feedback data provided by a given client 160 is preferably time-stamped or segmented to permit the success rate information to be correlated with the trigger criteria, and possibly with the pre-screening criteria, used by that client 160 to generate the associated list or lists of prospects 150. A software-based analysis component of the trigger notification system 100 analyzes the collected feedback data, collectively and/or on a client-specific basis, to identify the trigger criteria, and optionally the pre-screen criteria, that produces the "best" results (e.g., the highest success rate, as measured based on the percentage of the contacted prospects that accept the associated offer from the client).

Results of this analysis may be disseminated to the clients 160 via auto-generated, periodic reports to assist the clients 160 in modifying their trigger criteria and/or pre-screen criteria over time so as to improve their respective success rates. The reports may, for example, separately identify, for each of a plurality of different products and services, those criteria that tend to produce the highest success rates, as determined based on a collective analysis of all the feedback data and associated criteria settings of many different clients (e.g., tens to hundreds of different clients). The reports may also include client-specific recommendations based on the feedback data provided by the particular client.

The business entity that operates the trigger notification system 100 may also provide a computer-implemented service for enabling clients to request and obtain mutually exclusive lists of prospects, such that two competing clients 160 will not be notified of the same prospect at the same time. This feature may, for example, be implemented using a round robin protocol in which each time a consumer matches the trigger criteria of multiple competing clients, that consumer is added only to the prospect list of the next client in sequence. This feature, which may be implemented within the software of the trigger notification system 100, can significantly increase the success rates of the clients' campaigns, while reducing the likelihood that the consumers will be overwhelmed by the volume of contacts made by clients 160.

Figure 1B:
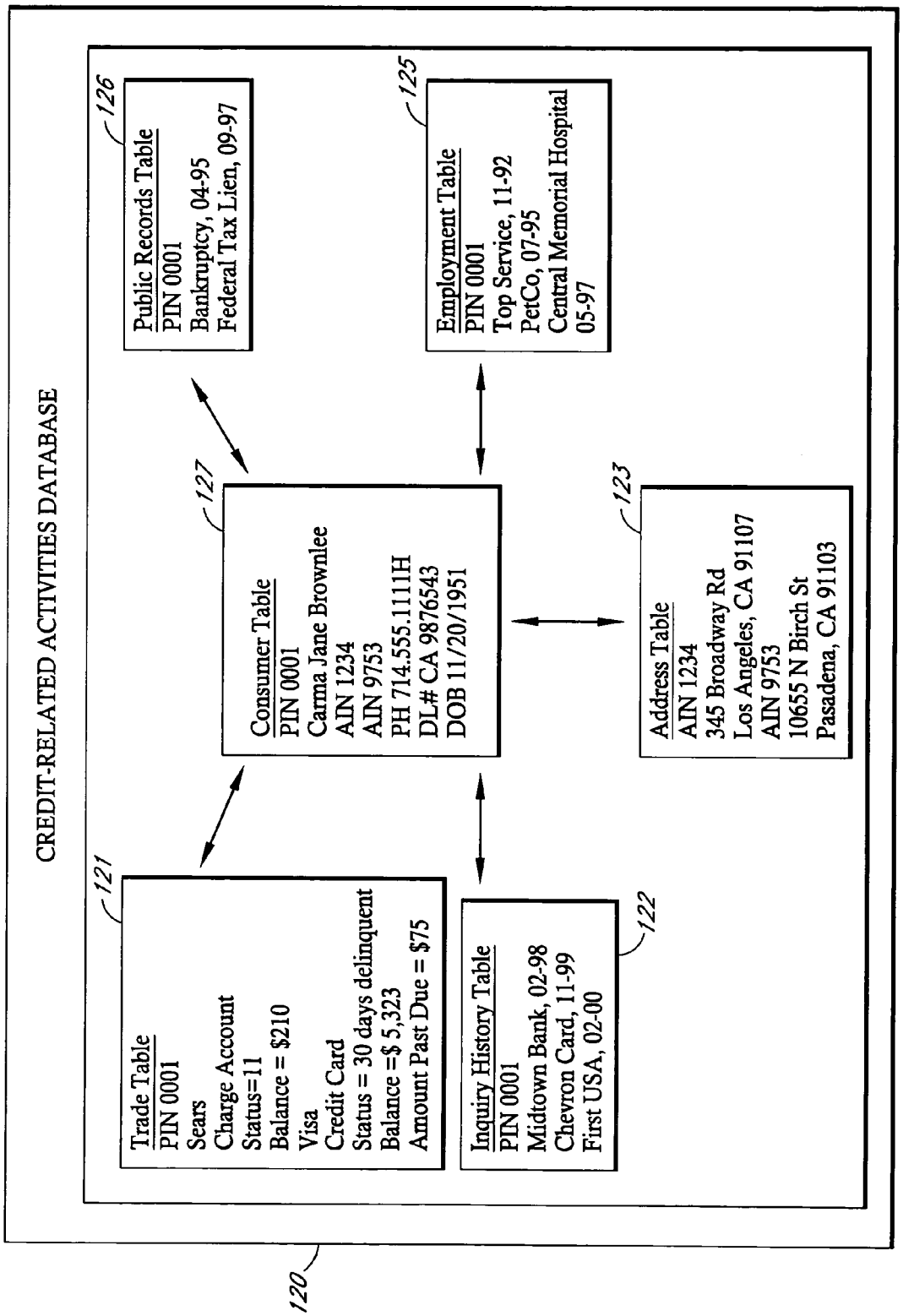
FIG. 1B is a block diagram that provides a more detailed view of the table structure of one embodiment an online database of credit-related consumer activity.

FIG. 1B depicts one example of a set of relations or tables 121-127 that store consumer credit-related data in a relational online database 120. In the example depicted in FIG. 1B, some or all of the tables 121-127 of the relational database 120 may be linked to one another using a unique personal identification number (PIN) that is assigned to each consumer in the database 120.

A consumer table 127 of the consumer activity database 120 includes identifying and other personal information for each consumer in the database 120. The consumer's record may include, by way of example, the consumer's PIN and full legal name, driver's license information, and the like.

A trade table 121 stores information about existing credit card relationships associated with each consumer. For example, in FIG. 1B, the consumer with PIN number '0001' has one Sears charge account and one Visa credit card, and up-to-date information about those accounts is stored in the table 121.

An inquiry history table 122 stores information about credit score inquiries that have been submitted to the online database 120. For example, in FIG. 1B, credit inquiries regarding the consumer with PIN number '0001' have been made within the last few years by Midtown Bank, Chevron Credit Card, and First USA.

An address table 123 stores information about known addresses, which may be indexed by an Address Identification Number (AIN), that are associated with consumers.

A public records table 126 stores information about consumers that may be relevant to a consumer's credit rating and that is typically available to the public. For example, information about bankruptcies, liens, property titles, and the like may be stored in the public record table 126. An employment table 125 stores information about a consumer's employment history. In other embodiments, other tables may be additionally or alternatively used to store data about the consumers' credit-related activities.

As depicted in FIG. 1B, many of the tables 121-127 of the relational credit-activities database 120 use the consumer PIN number as a primary key to link the tables 121-127 and to facilitate various database query and sorting operations, both simple and complex, that are implemented to carry out the functions of the trigger notification system 100. As will be familiar to one of skill in the design and use of relational databases, the information stored in the tables 121-127 of the database 120 may be organized as a relational database according to a wide variety of other organizational schema. Furthermore, in other embodiments, the database 120 may be organized as a type of information repository different from a relational database.

Figure 2:
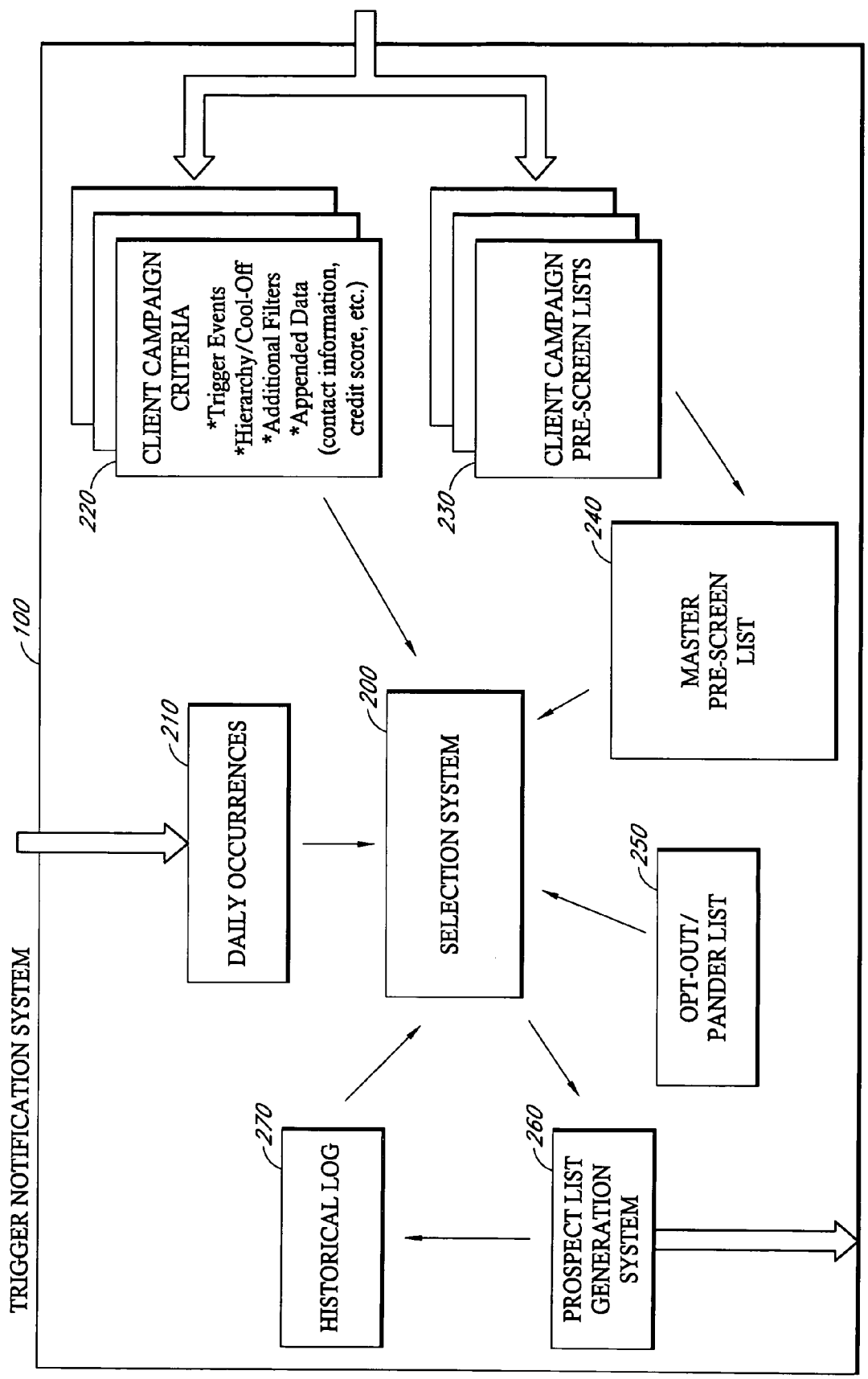
FIG. 2 is a block diagram that provides a more detailed view of one embodiment of a trigger notification system.

FIG. 2 is a block diagram that provides a more detailed view of one embodiment of a trigger notification system 100. As shown in FIG. 2, a selection system 200 of the trigger notification system 100 may receive several types of information, including: a set of daily credit-related occurrences 210; campaign pre-screen lists 230 for individual clients, which may be combined into a master pre-screen list 240; client campaign criteria 220, one or more opt-out/pander lists 250; and a historical log 270 of generated prospects triggers. These types of information will be described in greater detail below. The selection system 200 processes the information 210, 220, 240, 250, 270, and a prospect list generation system 260 prepares a daily list of prospect trigger names 150 to send to clients 160 for each client campaign.

A pre-screen list 230 of consumers who meet a client's criteria for a firm offer of credit is obtained for each client campaign. As was described with reference to FIG. 1A, the client 160 may compile and provide the pre-screen list 145 to the trigger notification system 100, or the client may request that the pre-screen list 140 be compiled from suitable consumer names identified in the database of consumer files 130. Either of these types of lists, or a combination of the two, may be used as the pre-screen list 230 of consumers for use by the selection system 200 of the trigger notification system 100.

For efficiently serving many clients 160 simultaneously, the trigger notification system 100 may compile a master pre-screen list 240 that may be compiled from the various campaign pre-screen lists 220 received from the clients 160. The master pre-screen list 240 advantageously takes into account the fact that a given consumer may meet the campaign criteria for more than one client and/or for more than one campaign. Thus, by combining the various campaign pre-screen lists 220, the trigger notification system 100 is able to more efficiently monitor the daily credit-related occurrence information 210 received from the online database 120 and to provide the list of prospect triggered names 150 to clients 160 in a timely, preferably daily, schedule. An example of a master pre-screen list 240 is described in greater detail with reference to FIG. 3.

The trigger notification system 100 receives information about daily credit-related occurrences 210 that were reported to and logged in the online database 120. In a preferred embodiment, the online database 120 receives information about credit-related activities around-the-clock and seven-days-a-week. In general, client campaigns that make use of prospect triggers are especially interested in credit-related inquiries associated with a given consumer. For example, the client may wish to be notified when information in the database 120 indicates that the consumer has made an inquiry about a home equity loan, a car loan, or a mortgage. However, some campaigns may be interested in events such as credit balance changes, and the like.

Information about inquiries newly-logged in the database 120 may be provided to the selection system 200 of the trigger notification system 100 once daily or at more frequent intervals. When the daily occurrences information 210 is provided to the trigger notification system 100 two or more times during the day, the selection system 200 may process the available portion of the incoming occurrence information 210 at various times throughout the day, and may provide the information to the prospect list generation system 260, in order to compile a daily prospect trigger list 150, as will be described in greater detail below.

In one simple embodiment, the selection system 200 simply collects information about credit inquiry occurrences associated with consumers on the master pre-screen list 240, and sends the information to the prospect list generation system 260 for separation according to individual client campaigns and for transmission to the appropriate clients 160. In another embodiment, the prospect list generation system 260 simply forwards a list received from the selection system 200 to an applicable client. The prospect list generation system 260 may also send a record to the historical log 270 of the list 150 that was sent to the client 160, as will be described in greater detail with reference to FIG. 5.

In other preferred embodiments, the selection system 200 accesses additional information before forwarding the triggered consumer names and other information to be sent to the client, in order to provide additional screening of the occurrence information 210. This additional processing may advantageously provide additional assurance that the list of consumer names 150 sent to client 160 contains only bona fide qualified consumers, which is of especial advantage to clients in jurisdictions in which government regulations specify that every consumer whose name is received by the client 160 on a prospect trigger list 150 must be extended a firm offer of credit.

In various embodiments, therefore, the selection system 200 receives further information about client campaign criteria 220, about consumer opt-out/pander lists 250 and/or the historical log 270 of previous trigger notifications sent to clients 160 for a given consumer.

The opt-out/pander list 250 includes the names of consumers who have specifically requested that they not be contacted with advertisements of various types, including credit-related offers. In some jurisdictions, consumers may register with one or more government programs that maintain consumer opt-out/pander lists 250. Government agencies may further undertake to enforce compliance with the opt-out/pander lists 250 by levying fines on businesses that contact consumers on the list(s). Although opt-out/pander lists 250 are frequently consulted in compiling a client's original campaign pre-screen list 220, clients may request that consumers on a given day's prospect trigger list be again compared to the opt-out/pander lists 250, in part to verify that the consumer has not been placed on the opt-out/pander list 250 since the campaign pre-screen list 220 was compiled. Consumers whose names appear on the master pre-screen list 240, who are associated with a daily trigger, and who are identified by the selection system 200 as appearing on an opt-out/pander list 250, will frequently be removed from the daily prospect list 150 before the list 150 is sent to the client 160.

As has been described above, clients 160 may also specify additional types of campaign-specific criteria 220 to be applied to consumers associated with daily occurrences that serve to filter the daily set of prospect triggers being compiled by the trigger notification system 100. For example, because a client's pre-screen list 230 is frequently regenerated only monthly or even quarterly, some consumer data of interest to the client 160 may have changed in the interim, and the client may wish to have critical data re-verified before a consumer's name is placed on the daily prospect trigger list 150 that will be supplied to the client 160. For example, a client 160 may wish to have one or more of the consumer's credit scores re-calculated using up-to-date information before being sent the consumer's name and contact information.

Furthermore, in an effort to avoid creating a negative impression for a consumer by making multiple offers of the same credit product or service within a short time period, a client may specify that a consumer who has been contacted by the client based on a prospect trigger notification should not be included on another prospect triggers list 150 for a specified period of time, such as for thirty, sixty, or ninety days. Such a period of non-contact may be known as a "cool-off" period. The selection system 200 may consult the historical log 270 of notification triggers activity to determine if the consumer is still within a cool-off period based on a previous contact by the client.

The selection system 200 may also receive additional information from the client 160 as part of the client campaign criteria 220. For example, in additional to information about the trigger events about which the client is interested, the client may send information about any desired hierarchy of campaigns, such that a consumer for whom a trigger event is identified for more than one campaign, may be put on a list of triggered names 150 for a campaign with a higher ranking and not put on a list 150 for a campaign with a lower ranking. For example, a client who is a credit card provider may instruct the trigger notification system 100 to implement a hierarchy that includes a rule stipulating: if a pre-screened consumer is triggered for a "Platinum Card" campaign and for a "Gold Card" campaign, put the consumer name on the "Platinum Card" list only.

The campaign criteria 220 may also include a request to append additional data to each consumer name included on the trigger notification list 150, as will be described in greater detail with reference to FIG. 3. Furthermore, the campaign criteria 220 may provide additional instructions to the selection system 200 for processing names identified as being associated with trigger events.

Once the selection system 200 has processed the information 210, 220, 240, 250, 270, the selection system 260 sends the resulting data to the prospect list generation system 260 for further processing and for generating the individual lists of triggered names 150 for making available to the clients 160.

FIG. 3 depicts an example of a master pre-screen list 240. In the example shown, a record is generated for each consumer whose name appears on at least one client campaign pre-screen list 230. In the example shown, each consumer name in the master pre-screen list 240 is associated with a consumer identifier used by the trigger notification system 100, such as the PIN described with reference to FIG. 1B. Indications are also entered into each consumer record to identify client campaigns for which the consumer meets the pre-screen criteria. Finally, in some embodiments, each client record stores information about additional data requested by clients. For example, a client who wishes to carry out a telephone advertising campaign may wish to have a contact telephone number for each consumer on the client's pre-screen list 230. The requested information may be appended onto the consumer's record, and may be delivered to the client 160 together with the consumer name, if and when the consumer's name is triggered by a credit-related occurrence identified by the trigger notification system 100. Although, for ease of description, each record in the master pre-screen list 240 of FIG. 3 is associated with one set of appended consumer data, in other embodiments, separate sets of appended consumer data may be stored for the individual campaigns. Furthermore, in some embodiments, the master pre-screen list 240 may identify consumers by personal identification number (PIN) without including the consumer names.

Thus, the master pre-screen list 240 forms a master list of consumers for whom the trigger notification system 100 is requested to monitor daily credit-related occurrences 210.

FIG. 4 depicts a very simplified example of a list of daily occurrences 210. In one embodiment, the online database 120 transmits the list of daily occurrences 210 to the trigger notification system 100 on a daily basis or more frequently. The list of daily occurrences 210 lists new consumer credit-related activity that has been reported to the online database 120 by financial institutions 122, merchants, 124, lenders, governments 128, or other informants. In the example shown in FIG. 4, each row, or record, represents an occurrence, and the records are organized according to the source of the information, or informant. In order to facilitate processing by the trigger notification system 100, the records are further organized by type of occurrence, such as by type of credit-product associated with each credit score inquiry for the consumers. In other embodiments, the daily occurrences list 210 may be organized according to any of a variety of other schemes. For example, records may be ordered in simple chronological order according to the time at which they were reported to the online database 120. Furthermore, in other embodiments, the daily occurrences list 210 may additionally or alternatively include any of a variety of other types of information that allows the trigger notification system 100 to identify trigger events that have occurred for consumers who are on one or more client pre-screen lists 230.

FIG. 5 depicts a simplified example of a prospect triggers historical log 270. As shown in FIG. 5, the prospect triggers historical log 270 keeps a record of prospect trigger notifications 150 that have been sent to clients 160. The information stored in the prospect triggers historical log 270 may be used to verify whether a consumer has been previously included in a prospect trigger list 150 for a given client campaign, and if so, when. As described in greater detail with reference to FIG. 2 and FIG. 6B, the prospect triggers historical log 270 may be used to provide additional filtering to a list of names from a client's pre-screen list 230 for whom a trigger event has occurred. In particular, the prospect triggers historical log 270 may assist the prospect list generation system 260 to implement a "cool-off" period, if requested by the client 160. In other embodiments, other methods of implementing a historical log for prospect trigger notifications may be used by the trigger notification system 100.

Figure 6A:
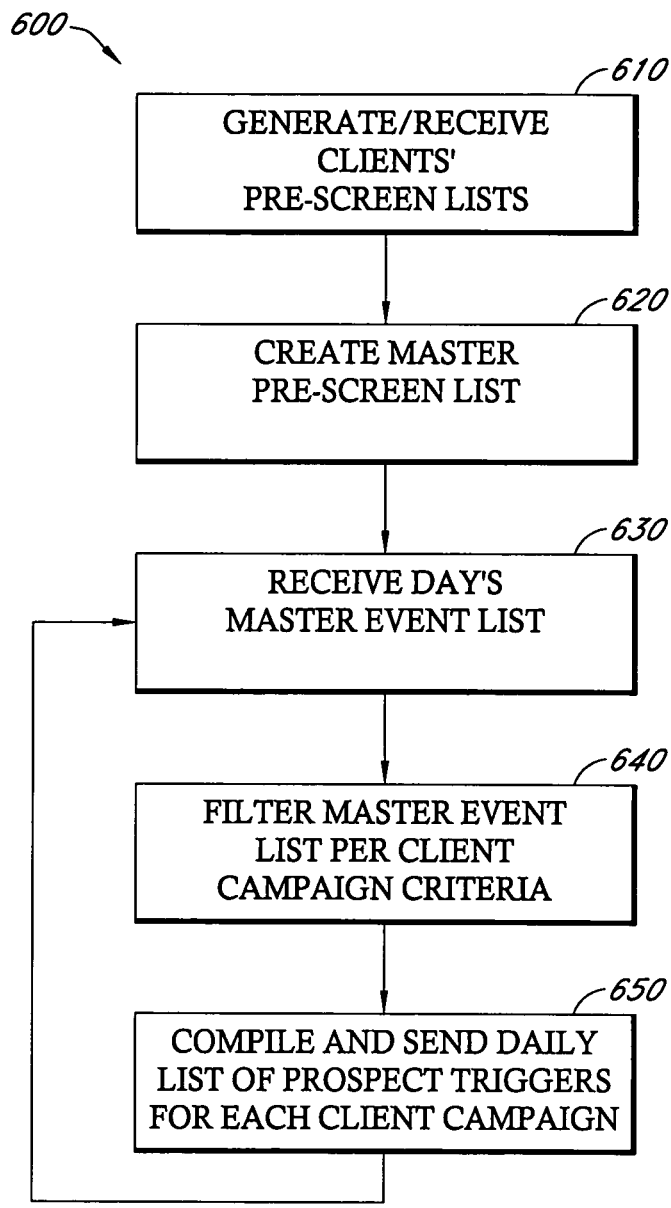
FIG. 6A is a flow chart that depicts one embodiment of a process for generating prospect triggered names.

FIG. 6A is a flow chart that depicts one embodiment of a process 600 for generating prospect trigger notifications 150. In FIG. 6A, the prospect trigger notifications 150 are generated on a daily basis, based on information that has been received by the online database 120 within the last twenty-four hours. In other embodiments, the prospect trigger notifications 150 may be generated at another frequency and/or may be based on data received by the online database 120 or other source of information within another recent period of time.

As depicted in FIG. 6A, the process 600 begins in Block 610 with the generation of a client's pre-screen list 220. As described with reference to FIG. 2, the client's pre-screen list 230 may comprise a list of names of consumers who match a set of criteria provided by the client 160. For example, a client 160 may wish to offer home equity loans to consumers who: (a) have a credit score over a threshold value, (b) do not have a foreclosure on their record, and (c) live in the greater Chicago area, and (d) have been at the same job for over three years. A client 160 may alternatively wish to specify a much more complex set of pre-screen criteria for identifying consumers qualified to receive the client's offer of credit or other products or services.

In some embodiments, the client 160 may request that the business entity offering the prospect trigger notification service also generate the pre-screen list 220 of consumers that match the client's specified criteria. As was described with reference to FIG. 1A, the business entity may search a data warehouse 130 to identify consumers that meet the client's pre-screen criteria.

Alternatively or additionally, the client 160 may generate, purchase, or otherwise acquire a list 145 of consumers that are deemed to be acceptable for a firm offer of credit and may provide the list 145 for use by the trigger notification system 100.

In Block 620, a master pre-screen list 240 is created for use by the trigger notification system 100. The master pre-screen list 240 combines information from a plurality of client campaign pre-screen lists 230, as exemplified in the sample master pre-screen list of FIG. 3. As was described with reference to FIG. 3, combining the various pre-screen lists 230 from the clients 160 that using the trigger notification system 100 on a given day allows the trigger notification system 100 to more efficiently process the incoming daily occurrences data 210 and therefore more quickly provide the clients 160 with their requested daily list of triggered names 150.

In Block 630, the trigger notification system 100 receives the list of new occurrences 210 that have been reported and entered into the online database 120 within a recent period of time, such as within the last day. A simplified example of a daily occurrences list 210 is depicted and described with reference to FIG. 4. In some embodiments, the daily occurrences list 210 may be processed before being sent to the triggers notification system 100, for example to reduce the processing burden involved in monitoring the daily occurrences list 210. For example, the set of all reported occurrences may be filtered to include only occurrences of interest to the clients 160 using the triggers notification system 100, for example, only credit score inquiries. As another example, the set of all reported occurrences may be filtered to include only occurrences associated with consumers on the pre-screen list 140, 145. As was described with reference to FIG. 4, the set of all reported occurrences may additionally or alternatively be sorted or otherwise organized in a manner so as to allow for efficient processing on the part of the triggers notification selection system 200.

In Block 640, the selection system 200 of the trigger notification system 100 filters the list of daily occurrences 210 to identify, for each client campaign, the consumers who (a) meet the client's pre-screen criteria, (b) are associated with a trigger event of interest to the client that occurred within a recent time period of interest to the client, and (c) also meet any additional criteria 220 for the campaign that has been specified by the client, as was described with reference to FIG. 2. For example, a client 160 may specify that some or all of the pre-screen criteria that allowed the consumer to be placed on the pre-screen list 230 should be verified as still being accurate. The client 160 may request that the trigger notification system 100 implement a "cool-off" period and/or that the trigger notification system 100 confirm that the consumers listed in the daily list of occurrences 210 are currently not on an opt-out/pander list 250.

In some embodiments, as has been described with reference to FIG. 6A, filtering the day's master event list 210 is carried out by the selection system 200. In other embodiments, the process of filtering the day's master event list 210 in may be carried out, in whole or in part, by the prospect list generation system 200. FIG. 6B will provide a more detailed flowchart that depicts in greater detail a sample implementation of the process for filtering of Block 640, as carried out by the selection system 200, the prospect list generation system 260, or by another system included in or associated with the trigger notification system 100.

Once the triggered consumer names have been filtered according the client's campaign criteria 220, the daily list of prospect triggered names 150 may be compiled by the prospect list generation system 260, together with any appended data 220 requested by the client, and sent, or otherwise made available, to the client 160. The prospect list generation system 260 may also notify the historical log 270 of the list of triggered names 150 sent to the client.

Figure 6B:
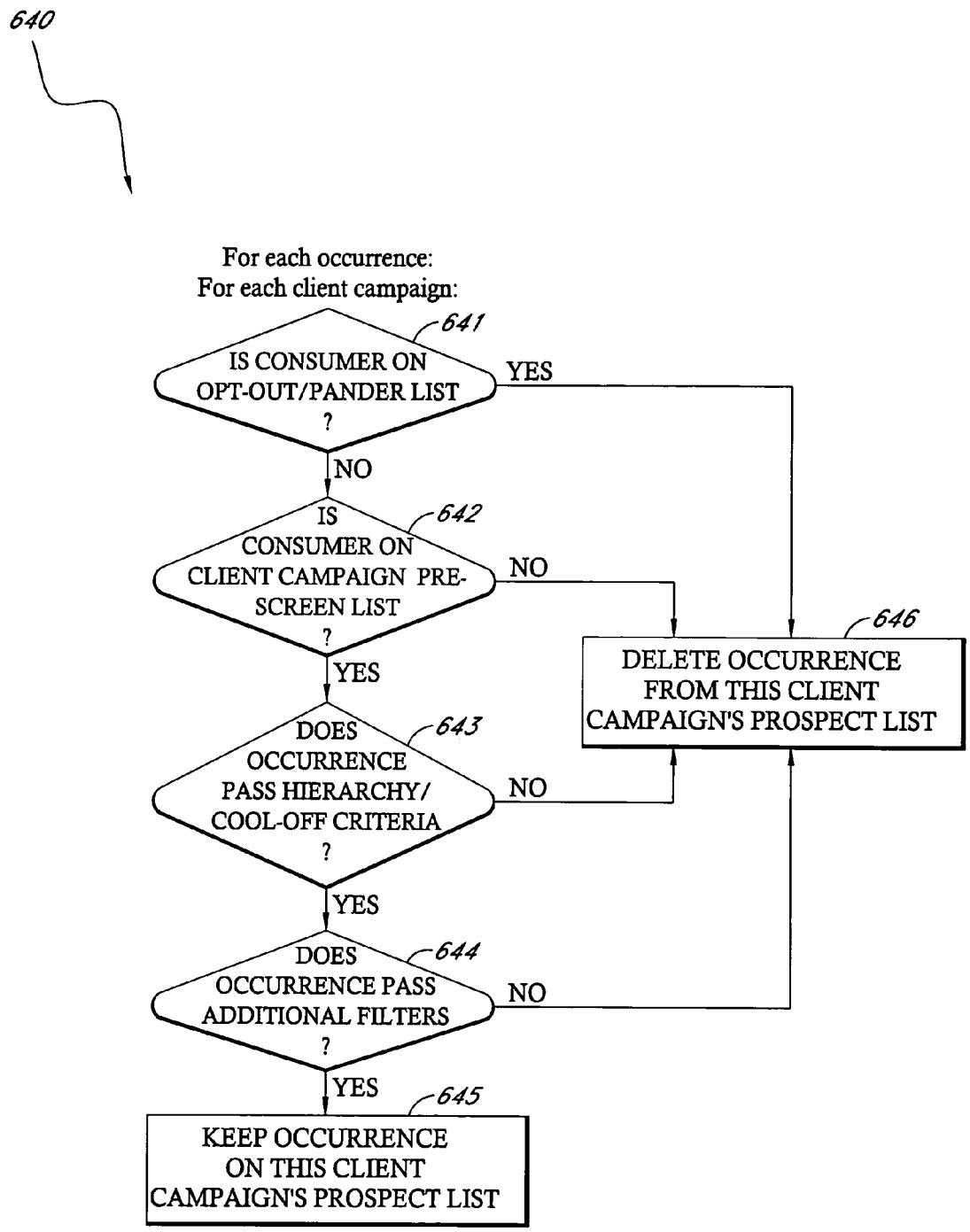
FIG. 6B is a flow chart that depicts a more detailed view of an embodiment of a process for filtering a master event list for generating a list of daily prospect triggered names.

FIG. 6B is a flow chart that depicts a more detailed view of an embodiment of a process for filtering a master event list for generating a list of daily prospect triggered names. The flowchart depicts a filtering process that may be applied to each trigger event occurrence that has been reported for a consumer name on the master pre-screen list 240, and, since campaign criteria are frequently different for different client campaigns, may be applied for each applicable client campaign, as well.

The process 640, as depicted in FIG. 6B, begins in Block 641, where the selection system 200 determines if the consumer name is on an opt-out/pander list 250, as has been earlier described with reference to FIG. 2 and elsewhere in the disclosure. If the consumer name is on an opt-out/pander list 250, the process moves to Block 646 where the selection system 200 deletes this trigger event occurrence from the client's daily list of triggered names 150 for this campaign. In some embodiments, if the consumer name is on an opt-out/pander list 250, in Block 646 the selection system 200 deletes the consumer name is deleted from all client campaigns.

If the consumer name is not on an opt-out/pander list 250, the process move to Block 642, where consumer names that are not on the client's pre-screen list for the campaign are deleted from, or not included in the list of triggered names 150 for the campaign.

In Block 643, any campaign-specific criteria 220 with regard to campaign hierarchies or "cool-off" periods provided by the client is used to further process the daily list of occurrences 210. For example, if the consumer name has already been added to a list 150 for a campaign with a higher ranking in the provided hierarchy of campaigns, the consumer name may be deleted, in Block 646, from the list 150 for any lower-ranking campaign of the client's. As another example, if information from the historical log 270 indicates that the consumer's name has been put on a prospect trigger list 150 within a recent period designated by the client as a "cool-off" period for the campaign, then the selection system 200 may, in Block 646, delete the consumer name from the list of triggered names 150 for this campaign.

In Block 644, the selection system 200 may check the consumer's trigger event with regard to one or more additional filters provided with the campaign criteria 220. For example, the client's credit score, address information, or employment information may be re-checked for accuracy.

If this occurrence of a trigger event for the consumer passes all of the above tests, in Blocks 641-644, then the consumer name for this trigger event may be included in a processed version of the list of triggered names 150 for the campaign.

As noted above, in various embodiments, the process 640 may be carried out, in whole or in part, by the selection system 200 and/or by the prospect list generation system 260. Thus, although the process 640 is described as being carried out by the selection 200, various embodiments of the trigger notification system 100 may carry out the functions of the process 640 in a variety of different ways.

Although the foregoing systems and methods have been described in terms of certain preferred embodiments, other embodiments will be apparent to those of ordinary skill in the art from the disclosure herein. On a very basic level, although many of the lists, repositories, and various data sets have been described herein as including consumer names, it will be readily apparent to one of skill in the art that the lists, repositories, various data sets and other applicable components, may be alternatively and even preferably implemented using one or more identifiers for the consumers other than their names. As another example, while the embodiments described herein have been described with respect to an online database 120 and a data warehouse 130, in other embodiments, the two databases 120, 130 may be implemented as a single database configured to provide the functionality described herein with reference to the online database 120 and the data warehouse 130. Furthermore, while the trigger notification system 100 has been described as monitoring updates to the online database 120, in other embodiments the trigger notification system 100 additionally or alternatively monitors updates to the data warehouse 130. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms. Accordingly, the accompanying claims and their equivalents are intended to cover such forms or modifications as would fall within the scope and spirit of the invention.

What is claimed is:

1. A computer-implemented system for providing, to a client, notifications about consumers, the notifications indicating that the consumers are currently good prospects for accepting a firm offer of credit from the client, the system comprising:
    a data warehouse configured to store electronic representations of credit-related and demographic information about a general population of consumers, said general population of consumers comprising individual consumers;
    a subset data repository for storing an electronic representation of a subset of the general population of consumers of the data warehouse;
    a client interface system comprising one or more data input devices, said client interface system being configured to accept client-selected pre-screen attributes criteria, which comprise client-selected attributes of consumers from the general population, the client-selected attributes being indicative to the client of consumers whom the client considers to be worthy of a firm offer of credit from the client, said client interface system being further configured to accept an indication of at least one client-selected trigger event, wherein a trigger event is a type of financial event that is associated with a consumer and with a financial entity other than the client, said type of financial event being selected by the client as being indicative of an individual consumer's current interest in receiving a firm offer of credit;
    a computer-implemented pre-screen rules engine configured to receive the client-selected pre-screen attributes criteria, said pre-screen rules engine being further configured to programmatically access and analyze the credit-related and demographic information in the data warehouse and to identify, based at least in part on the client-selected pre-screen attributes criteria, a subset of the individual consumers from the general population of consumers in the data warehouse, each of whom the client considers to be worthy of a firm offer of credit, the rules engine being further configured to store the identified subset of individual consumers in the subset data repository;
    an online credit activity database configured to store data about financial events associated with the general population of consumers, said online credit activity database being further configured to receive a plurality of updates from a variety of entities other than the client, such entities comprising at least one of: merchants, lenders, financial institutions, and government entities, each of said updates providing information regarding at least one financial event, each financial event being associated with an individual consumer from the general population of consumers and with at least one entity other than the client, wherein at least one of the financial events is associated with an individual consumer who is a member of the subset of individual consumers stored in the subset data repository, and wherein at least one of the financial events is of the at least one type selected by the client as being the at least one trigger event, wherein said online credit activity database is configured to store an indication of when each update was received; and
    a trigger notification system configured to:
        receive an indication of the subset of individual consumers stored in the subset data repository;
        receive an indication of the at least one client-selected trigger event accepted by the client interface system;
        receive, from the online credit activity database, on a daily or more frequent basis, information regarding recent updates about financial events received by the online credit activity database;
        filter the information about the recent updates to identify financial events related to consumers who are included in the subset of individual consumers stored in the subset data repository;
        filter the information about the recent updates to identify financial events which are of the at least one type selected by the client as being a trigger event; and
        on a daily or more frequent basis, provide an indication for the client of the consumers belonging to the subset of individual consumers identified by the pre-screen rules engine and stored in the subset data repository who are also associated with a recent financial event of the at least one type selected by the client as being a trigger event.

2. The computer-implemented system of claim 1, wherein the indication for the client of the individual consumers provided by the trigger notification system comprises contact information for the indicated consumers.

3. The computer-implemented system of claim 1, wherein the client interface system is further configured to accept updates to at least one of the client-selected pre-screen attributes criteria and the client-selected at least one trigger event.

4. The computer-implemented system of claim 1, wherein the at least one client-selected trigger event comprises at least one of:
    automobile loan credit score inquiries, mortgage loan credit score inquiries, home equity loan credit score inquiries, credit card credit score inquiries, newly established automobile loans, newly established mortgage loans, newly established home equity loans, and newly established credit card accounts.

5. The computer-implemented system of claim 1, wherein the client interface system is further configured to receive from the client data that is indicative of a success rate for firm offers of credit made to consumers whose names were included in the indication provided by the trigger notification system, said client interface system being further configured to correlate said success rate with said set of client-selected pre-screen attributes criteria, and to generate one or more reports of different success rates associated with different sets of client-selected pre-screen attributes criteria.

6. The computer-implemented system of claim 1, wherein at least a portion of the subset of the general population of consumers stored in the subset data repository is provided by the client.

7. The computer-implemented system of claim 1, wherein the subset of individual consumers excludes consumers who are current customers of the client.

8. The computer-implemented system of claim 1, wherein the subset of individual consumers excludes consumers with whom the client has a current business relationship.

9. A computer-implemented method of providing to a client notifications about consumer financial events between consumers and financial entities other than the client, the method comprising:

receiving, via a client interface system comprising one or more data input devices, a set of client-selected pre-screen attributes criteria comprising attributes that are indicative to the client of consumers whom the client considers to be worthy of a firm offer of credit from the client;

filtering, based at least in part on the client-selected pre-screen attributes criteria, data in a data warehouse configured to store electronic representations of credit-related and demographic information about a general population of consumers, said general population of consumers comprising individual consumers, to identify a subset of the individual consumers from the general population of consumers in the data warehouse, each of whom the client consider s to be worthy of a firm offer of credit;

populating a subset data repository with an electronic indication of the identified subset of individual consumers;

receiving, from a first financial institution, data identifying one or more types of client-selected trigger events, which are financial events, occurring between at least one consumer and at least one financial entity other than the client that are deemed by the client to be indicative of a consumer's current interest in obtaining an offer of credit or of a change in the consumer's credit-worthiness;

electronically monitoring, on a periodic basis, in an online credit activity database that is configured to store data about financial events, each financial event being associated with at least one individual consumer from the general population of consumers and with at least one financial entity, data about recent updates received by the online credit activity database from a variety of entities other than the client, such entities comprising at least one of: merchants, lenders, financial institutions, and government entities, to analyze the credit-related activity of the individual consumers who are included in the identified subset of individual consumers from the subset data repository, and to identify an indication of one or more financial events occurring since a previous monitoring of the online credit activity database, the one or more financial events occurring between at least one consumer who is included in the identified subset of individual consumers and at least one financial entity other than the client, the one or more financial events further being of the one or more types of client-selected trigger events that are deemed by the client to be indicative of a consumer's current interest in obtaining an offer of credit; and providing an electronic notification to the client indicative of the at least one consumer associated with the identified one or more trigger events occurring since a previous monitoring of the database between the at least one consumer and the at least one financial entity other than the client;

said method performed by a computerized prospect trigger system that comprises one or more computers.

10. The computer-implemented method of claim 9, the electronic notification further including information about the one or more types of trigger events that have been identified.

11. The computer-implemented method of claim 9, the electronic notification comprising information about trigger events occurring within a previous one-day time period.

12. The computer-implemented method of claim 9, the periodic basis being daily.

13. The computer-implemented method of claim 9, said electronic monitoring in the online credit activity comprising monitoring in the online credit activity database, which is updated at least daily.

14. The computer-implemented method of claim 9, wherein populating the subset data repository with the electronic indication of the identified subset of individual consumers further comprises deleting from the identified subset of individual consumers at least one of the following types of consumers: consumers who have requested not to receive offers of credit, consumers that appear on an opt-out/pander list, consumers who have been previously included in a notification within a pre-determined recent time period, and consumers who appear in the notification more than a pre-determined number of times.

15. The computer-implemented method of claim 9, wherein the subset of individual consumers excludes consumers who are current customers of the client.

16. The computer-implemented method of claim 9, wherein the subset of individual consumers excludes consumers with whom the client has a current business relationship.

* * * * *